United States Patent
Tomiyama et al.

(10) Patent No.: US 9,604,663 B2
(45) Date of Patent: Mar. 28, 2017

(54) STEERING SYSTEM

(71) Applicant: JTEKT CORPORATION, Osaka-shi, Osaka (JP)

(72) Inventors: Hiromitsu Tomiyama, Kashihara (JP); Hidenobu Tanaka, Shiki-gun (JP); Masayuki Nagaoka, Kashiba (JP)

(73) Assignee: JTEKT CORPORATION, Kariya-shi (JP)

( * ) Notice: Subject to any disclaimer, the term of this patent is extended or adjusted under 35 U.S.C. 154(b) by 0 days.

(21) Appl. No.: 15/200,879

(22) Filed: Jul. 1, 2016

(65) Prior Publication Data

US 2017/0008549 A1 Jan. 12, 2017

(30) Foreign Application Priority Data

Jul. 8, 2015 (JP) .................. 2015-137046

(51) Int. Cl.
*B62D 1/187* (2006.01)
*B62D 1/184* (2006.01)

(52) U.S. Cl.
CPC ............. *B62D 1/187* (2013.01); *B62D 1/184* (2013.01)

(58) Field of Classification Search
CPC ........... B62D 1/187; B62D 1/184; B62D 1/16
See application file for complete search history.

(56) References Cited

U.S. PATENT DOCUMENTS

| | | | | |
|---|---|---|---|---|
| 6,092,957 A * | 7/2000 | Fevre | ..................... | B62D 1/184 280/775 |
| 6,659,504 B2 * | 12/2003 | Riefe | ..................... | B62D 1/195 280/775 |
| 7,083,197 B2 * | 8/2006 | Lutz | ..................... | B62D 1/184 280/775 |
| 7,533,592 B2 * | 5/2009 | Hashimoto | ............. | F16D 23/06 192/53.34 |
| 7,752,940 B2 * | 7/2010 | Lutz | ..................... | B62D 1/184 280/775 |
| 8,006,587 B2 * | 8/2011 | Schnitzer | ............... | B62D 1/184 74/493 |
| 8,505,408 B2 * | 8/2013 | Havlicek | ............... | B62D 1/184 280/775 |
| 8,881,618 B2 * | 11/2014 | Buzzard | ................ | B62D 1/184 280/775 |
| 9,156,491 B2 * | 10/2015 | Okano | ................... | B62D 1/187 |
| 2004/0057786 A1 * | 3/2004 | Heiml | ..................... | B60N 2/23 403/373 |
| 2009/0013817 A1 | 1/2009 | Schnitzer et al. | | |

* cited by examiner

*Primary Examiner* — Drew Brown
*Assistant Examiner* — Timothy Wilhelm
(74) *Attorney, Agent, or Firm* — Oliff PLC

(57) ABSTRACT

A steering system includes: an upper bracket that supports a column jacket so that the column jacket is pivotable about a central shaft; a pair of first tooth rows that are supported by the upper bracket and are arranged side by side in an axial direction; and a tooth member that is pivotable together with the column jacket and is movable in a right-and-left direction. The tooth member has second teeth that are formed in two locations spaced apart from each other in the axial direction and that can mesh with the pair of the first tooth rows. The tooth tip angle of first teeth in one first tooth row of the pair of the first tooth rows is different from the tooth tip angle of the first teeth in the other first tooth row that is more distant from the central shaft than the one first tooth row.

2 Claims, 12 Drawing Sheets

STEERING SYSTEM

INCORPORATION BY REFERENCE

The disclosure of Japanese Patent Application No. 2015-137046 filed on Jul. 8, 2015 including the specification, drawings and abstract, is incorporated herein by reference in its entirety.

BACKGROUND OF THE INVENTION

1. Field of the Invention

The invention relates to a steering system.

2. Description of Related Art

A steering column described in US Patent Application Publication No. 2009/0013817 (US 2009/0013817 A1) includes a setting unit, a holding unit, a tooth plate, a press-on member, and a clamp bolt. The setting unit can be pivoted to adjust the position of the steering column in a certain adjustment direction. The holding unit holds the setting unit. To the setting unit, a jacket unit that holds a steering shaft is attached. The holding unit has a plurality of teeth arranged in the adjustment direction. The tooth plate also has a plurality of teeth arranged in the adjustment direction. The clamp bolt is inserted through the press-on member and the tooth plate, and can be pivoted together with the setting unit.

By operating a lever attached to the clamp bolt, the press-on member can be moved toward the holding unit. When the press-on member moves toward the holding unit, the tooth plate is pressed against the press-on member to move toward the holding unit. When the teeth of the moving tooth plate enter spaces between the teeth of the holding unit, the teeth of the holding unit and the teeth of the tooth plate mesh with each other. Thus, the position of the jacket unit in the adjustment direction is fixed.

The adjustment direction defined in US 2009/0013817 A1 is a direction vertically intersecting the axial direction of the steering shaft. In the steering column described in US 2009/0013817 A1, the position of the jacket unit in the intersecting direction is fixed by causing the teeth to mesh with each other. In this case, meshing strength between the teeth needs to be increased by firmly meshing the teeth with each other, in order to prevent the position of the jacket unit from becoming misaligned even if a vehicle is subjected to strong impact in a collision.

SUMMARY OF THE INVENTION

An object of the present invention is to provide a steering system in which a steering shaft is held by a column jacket and the position of the column jacket in a direction intersecting the axial direction of the steering shaft is fixed by causing teeth to mesh with each other and which can increase meshing strength between the teeth.

A steering system according to one aspect of the present invention includes: a steering shaft to one end of which a steering member is coupled; a column jacket that holds the steering shaft and is pivotable about a pivot axis that is on the opposite side of the steering shaft from the one end in an axial direction; a bracket that is fixed to a vehicle body and supports the column jacket so that the column jacket is pivotable; an operation member that is operated to allow and prevent pivoting of the column jacket with respect to the bracket; a pair of tooth rows each including a plurality of first teeth each of which has a tooth trace extending in an orthogonal direction orthogonal to both of the axial direction and an intersecting direction vertically intersecting the axial direction and that are arranged along the intersecting direction, the pair of tooth rows being supported by the bracket and being arranged side by side in the axial direction; and a tooth member including a second tooth that has a tooth trace extending in the orthogonal direction, is formed at least one in each of two locations spaced apart from each other in the axial direction, and is configured to mesh with the pair of tooth rows, the tooth member being pivotable together with the column jacket and being movable in the orthogonal direction in accordance with operation of the operation member. In the steering system, a tooth tip angle of the first teeth in one tooth row of the pair of tooth rows is different from a tooth tip angle of the first teeth in the other tooth row that is more distant from the pivot axis than the one tooth row.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
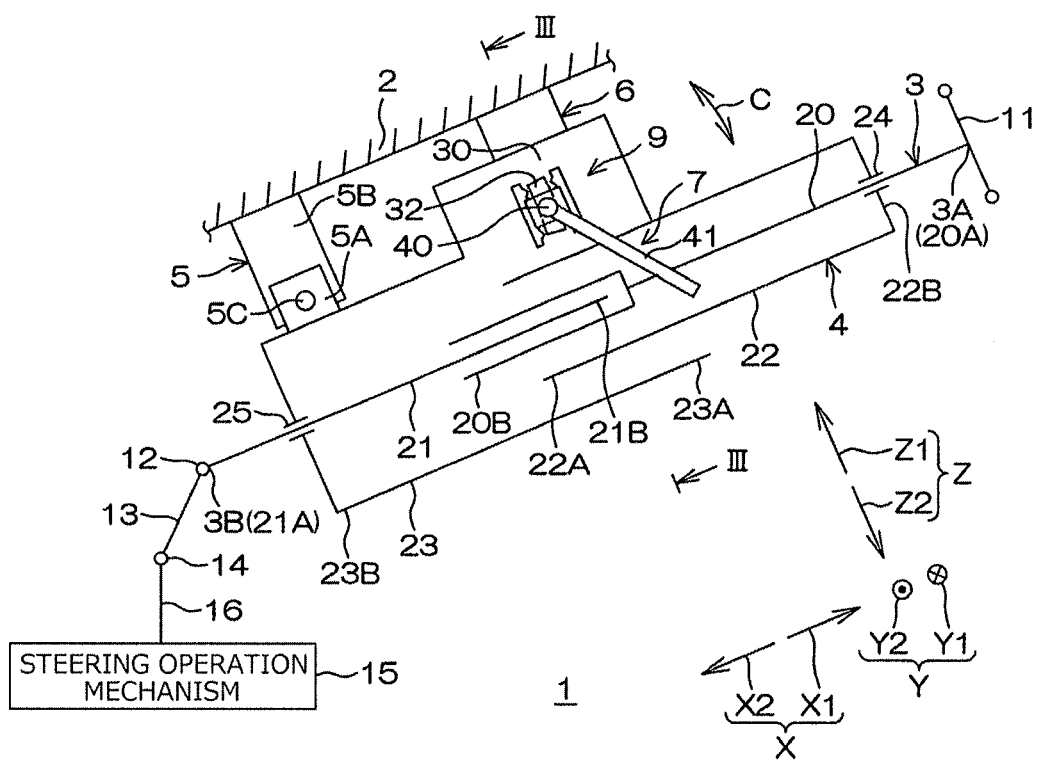
FIG. 1 is a side view of a schematic structure of a steering system according to one embodiment of the present invention.

Embodiments of the present invention will now be described in detail with reference to the accompanying drawings. FIG. 1 is a side view of a schematic structure of a steering system 1 according to one embodiment of the present invention. In FIG. 1, the left side in the plane of the page corresponds to the front side of a vehicle body 2 on which the steering system 1 is mounted, the right side in the plane of the page corresponds to the rear side of the vehicle body 2, the upper side in the plane of the page corresponds to the upper side of the vehicle body 2, and the lower side in the plane of the page corresponds to the lower side of the vehicle body 2.

As seen in FIG. 1, the steering system 1 mainly includes a steering shaft 3, a column jacket 4, a lower bracket 5, an upper bracket 6, a position adjustment mechanism 7, a telescopic locking mechanism 8 (see FIG. 2 described later), and a tilt locking mechanism 9. To one end 3A that is the rear end of the steering shaft 3, a steering member 11 such as a steering wheel is coupled. In the steering shaft 3, the other end 3B that is the front end thereof is coupled to a pinion shaft 16 of a steering operation mechanism 15 via a universal joint 12, an intermediate shaft 13, and a universal joint 14 in this order.

The steering operation mechanism 15 includes a rack-and-pinion mechanism, for example. The steering operation mechanism 15 turns steered wheels (not depicted) such as tires in accordance with transmitted rotation of the steering shaft 3. The steering shaft 3 extends in the longitudinal direction of the vehicle body 2. Hereinafter, the direction in which the steering shaft 3 extends is called "axial direction X" of the steering shaft 3. The axial direction X is inclined with respect to the horizontal direction so that the other end 3B is positioned lower than the one end 3A. The rear side that is the one end 3A side in the axial direction X is denoted by reference character X1, and the front side that is the opposite side from the one end 3A in the axial direction X is denoted by X2.

Out of orthogonal directions orthogonal to the axial direction X, the direction perpendicular to the plane of the page in FIG. 1 is called "right-and-left direction Y", and the direction extending substantially vertically in FIG. 1 is called "up-and-down direction Z". In the right-and-left direction Y, the side farther from a viewer with respect to the plane of the page of FIG. 1 is the right side Y1, and the side closer to the viewer with respect to the plane of the page is the left side Y2. In the up-and-down direction Z, the upper side is denoted by reference character Z1, and the lower side is denoted by Z2. In the drawings other than FIG. 1, the axial direction, the rear side, the front side, the right-and-left direction, the right side, the left side, the up-and-down direction, the upper side, and the lower side are denoted by the same reference characters as in FIG. 1.

The steering shaft 3 includes an upper shaft 20 and a lower shaft 21 that extend in the axial direction X. The upper shaft 20 is positioned closer to the rear side X1 than the lower shaft 21 is, and is disposed concentrically with the lower shaft 21. A rear end 20A of the upper shaft 20 is the one end 3A of the steering shaft 3. A front end 21A of the lower shaft 21 is the other end 3B of the steering shaft 3. A rear end portion 21B of the lower shaft 21 is inserted into a front end portion 20B from the front side X2. The front end portion 20B is formed in the upper shaft 20 so as to have a cylindrical shape.

The lower shaft 21 is coupled to the upper shaft 20 by spline fitting or serration fitting. Thus, the upper shaft 20 and the lower shaft 21 can rotate together and can move relatively to each other along the axial direction X. By movement of the upper shaft 20 in the axial direction X with respect to the lower shaft 21, the steering shaft 3 can contract and extend along the axial direction X.

The column jacket 4 as a whole is a hollow body extending in the axial direction X. The column jacket 4 accommodates and holds the steering shaft 3. The column jacket 4 includes an upper jacket 22 and a lower jacket 23 each having a tubular shape extending in the axial direction X. The upper jacket 22 is positioned closer to the rear side X1 than the lower jacket 23. A front end portion 22A of the upper jacket 22 is inserted into a rear end portion 23A of the lower jacket 23 from the rear side X1. The upper jacket 22 in this state can move relatively to the lower jacket 23 in the axial direction X. By this movement of the upper jacket 22 relative to the lower jacket 23, the entire column jacket 4 can contract and extend along the axial direction X.

The rear end portion 22B of the upper jacket 22 is coupled to the upper shaft 20 via a bearing 24. The front end portion 23B of the lower jacket 23 is coupled to the lower shaft 21 via a bearing 25. Thus, the column jacket 4 supports the steering shaft 3 via the bearing 24 and the bearing 25 so that the steering shaft 3 is rotatable. The upper shaft 20 and the upper jacket 22 that are coupled to each other can move relatively to the lower shaft 21 and the lower jacket 23 in the axial direction X. Accordingly, the column jacket 4 can contract and extend together with the steering shaft 3. This extension and contraction of the steering shaft 3 and the column jacket 4 is called "telescoping". Adjusting the position of the one end 3A (i.e., the steering member 11 coupled to the one end 3A) of the steering shaft 3 in the axial direction X by the telescoping is called "telescopic adjustment".

The lower bracket 5 includes a pair of right and left movable brackets 5A (see also FIG. 2), a fixed bracket 5B, and a central shaft 5C. The movable brackets 5A are fixed to an upper-side outer peripheral surface of the front end portion 23B of the lower jacket 23. The fixed bracket 5B is fixed to the vehicle body 2. The central shaft 5C extends in the right-and-left direction Y. The central shaft 5C is disposed so as to extend between the movable brackets 5A and passes through the fixed bracket 5B. Thus, the front end portion 23B of the lower jacket 23 is coupled to the vehicle body 2. The movable brackets 5A are formed on the front end portion 23B of the lower jacket 23. Thus, the central shaft 5C is disposed in a position closer to the front side X2 in the column jacket 4.

The movable brackets 5A are supported by the fixed bracket 5B so as to be pivotable about the central shaft 5C. Thus, the entire column jacket 4 together with the steering shaft 3 can pivot about the central shaft 5C up and down with respect to the fixed bracket 5B and the upper bracket 6. This pivoting of the column jacket 4 about the central shaft 5C serving as a pivot axis is called "tilt", and the substantially vertical direction along a circular arc centered on the central shaft 5C is called "tilt direction C". The tilt direction C is an intersecting direction vertically intersecting the axial direction X, and is orthogonal to the right-and-left direction Y. The up-and-down direction Z, which is an intersecting direction vertically intersecting the axial direction X and is a tangential direction to the tilt direction C, is orthogonal to the right-and-left direction Y.

Adjusting the position of the steering member 11 in the tilt direction C by the tilt is called "tilt adjustment". By causing the column jacket 4 to pivot along the tilt direction C, the tilt adjustment can be performed. The lower jacket 23 is coupled to the vehicle body 2 via the lower bracket 5, and thus cannot move in the axial direction X. Accordingly, during the telescopic adjustment, the upper jacket 22 actually moves.

Figure 2:
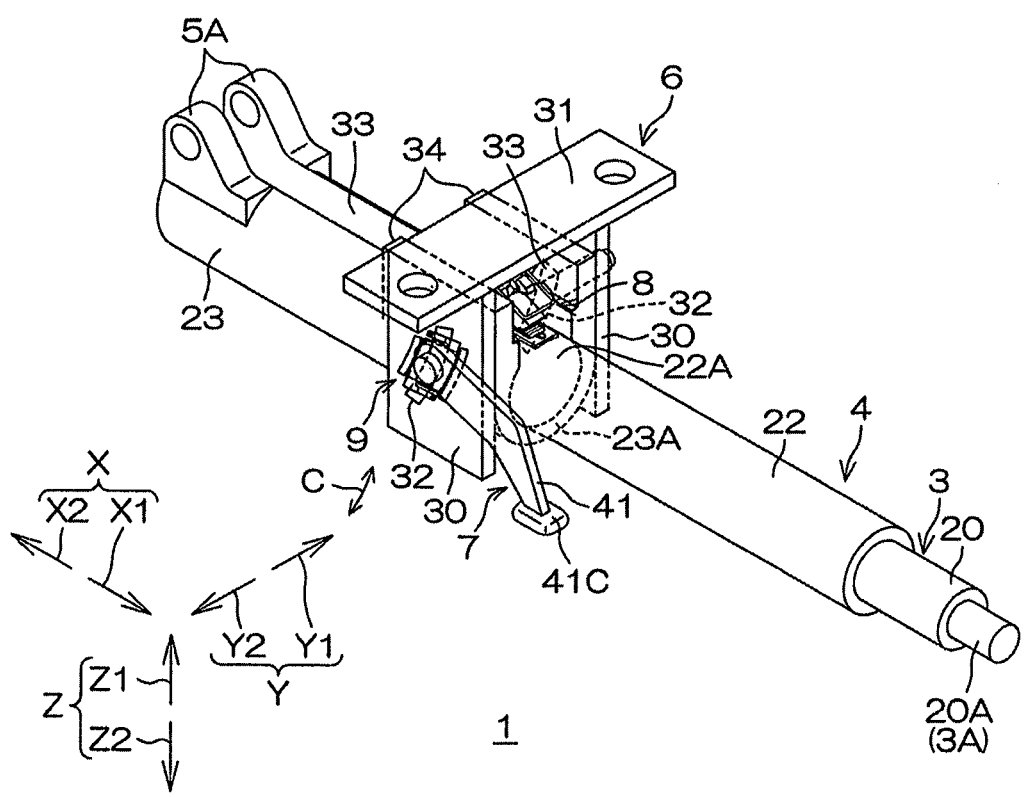
FIG. 2 is a perspective view of the steering system.

The upper bracket 6 is a bracket that supports the rear end portion 23A of the lower jacket 23 and via which the rear end portion 23A is coupled to the vehicle body 2. As seen in FIG. 2 that is a perspective view of the steering system 1, the upper bracket 6 integrally includes a pair of side plates 30 and a connecting plate 31 that is thin in the up-and-down direction Z. The pair of side plates 30 are thin in the right-and-left direction Y and face each other with the rear end portion 23A of the lower jacket 23 interposed therebetween. The connecting plate 31 is joined to the respective upper end portions of the pair of the side plates 30.

In the pair of side plates 30, at the same position when viewed from the right-and-left direction Y, tilt slots 32 are formed. The tilt slots 32 extend in a circular-arc-like manner along the tilt direction C. The connecting plate 31 has portions extending outward of the pair of side plates 30 in the right-and-left direction Y. The entire upper bracket 6 is fixed to the vehicle body 2 (see FIG. 1) by bolts (not depicted), for example, that are inserted thereinto.

On the upper-side outer peripheral surface of the lower jacket 23, a slit 33 is formed that extends over the entire area in the axial direction X and penetrates the lower jacket 23 in the up-and-down direction Z. On the rear end portion 23A of the lower jacket 23, a pair of extending portions 34 are integrally formed that define the slit 33 from the right-and-left direction Y and extend toward the upper side Z1. Each extending portions 34 has a plate-like shape extending in the axial direction X and the up-and-down direction Z and is thin in the right-and-left direction Y. The pair of the extending portions 34 are disposed between the pair of the side plates 30. Each extending portion 34 faces, from the right-and-left direction Y, the corresponding side plate 30 that is positioned on the same side in the right-and-left direction Y.

Figure 3:
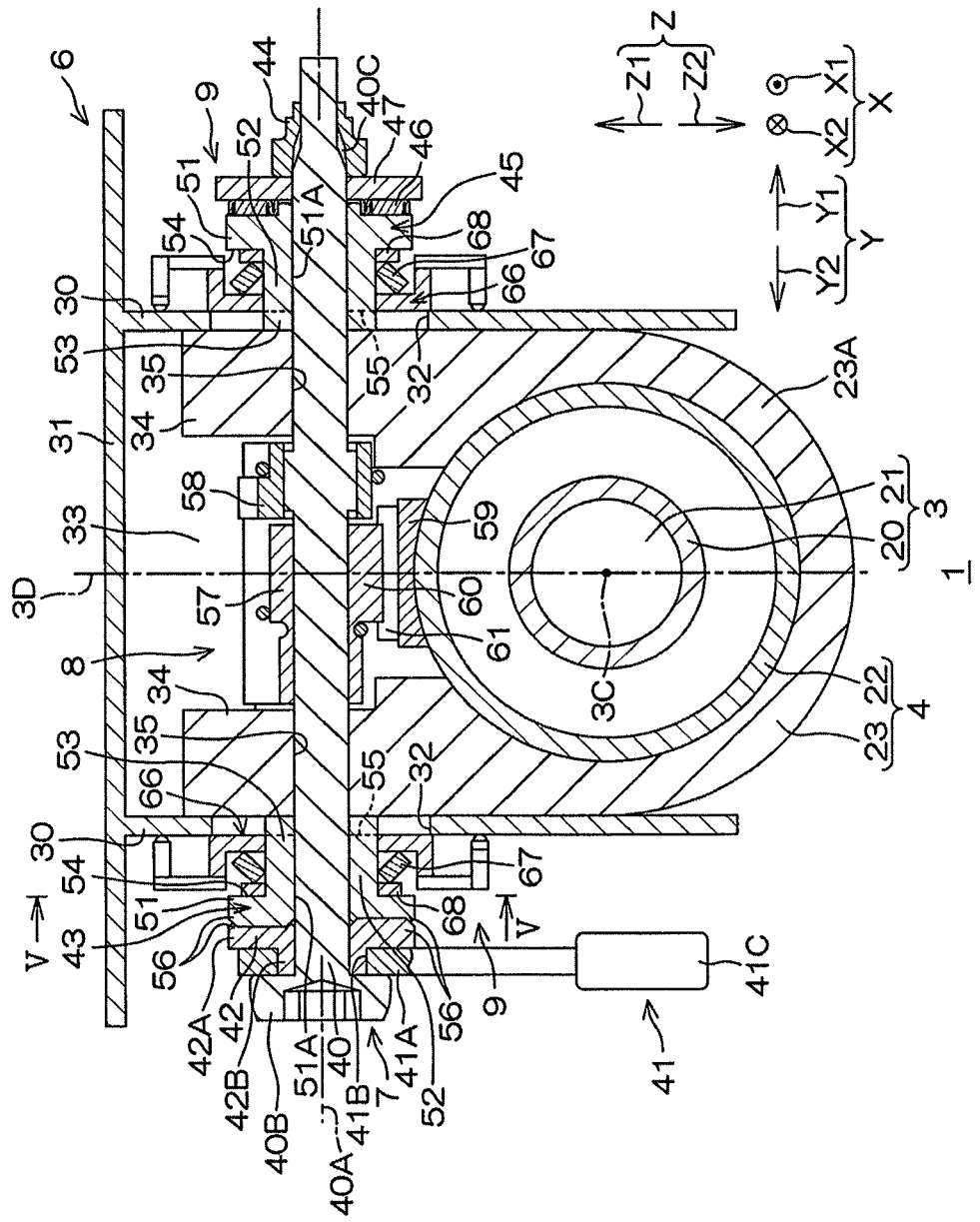
FIG. 3 is a sectional view along line III-III in FIG. 1.

FIG. 3 is a sectional view along line III-III in FIG. 1. In FIG. 3, the virtual plane including the central axis 3C of the steering shaft 3 and extending in the up-and-down direction Z is called "reference plane 3D". As seen in FIG. 3, at positions in the pair of the extending portions 34 that are the same when viewed from the right-and-left direction Y, circular insertion holes 35 are formed that penetrate the respective extending portions 34 in the right-and-left direction Y. The insertion holes 35 of the pair of the extending portions 34 overlap part of the tilt slots 32 of the pair of the side plates 30 of the upper bracket 6 when viewed from the right-and-left direction Y.

The position adjustment mechanism 7 is a mechanism configured to release locking of the position of the steering member 11 (see FIG. 1) for tilt adjustment and telescopic adjustment, and to lock the position of the steering member 11 after the tilt adjustment and the telescopic adjustment. The position adjustment mechanism 7 includes a tilt bolt 40 as a clamping shaft, an operation member 41, a cam 42, a moving member 43, a nut 44, a moving member 45, a needle roller bearing 46, and a thrust washer 47.

The tilt bolt 40 is a metallic bolt having a central axis 40A extending in the right-and-left direction Y. The tilt bolt 40 has a head portion 40B at the left end portion thereof and a thread groove 40C formed on the outer peripheral surface at the right end portion thereof. A portion of the tilt bolt 40 extending on the right side Y1 of the head portion 40B is inserted into the tilt slots 32 of the pair of the side plates 30 and the insertion holes 35 of the pair of the extending portions 34 in positions closer to the upper side Z1 than the steering shaft 3. In this state, the head portion 40B is positioned closer to the left side Y2 than the side plate 30 on the left side Y2, and the thread groove 40C is positioned closer to the right side Y1 than the side plate 30 on the right side Y1.

The operation member 41 is a lever, for example, that can be gripped. In a base end portion 41A of the operation member 41, an insertion hole 41B penetrating the operation member 41 in the right-and-left direction Y is formed. Into the insertion hole 41B, the left end portion of the tilt bolt 40 is inserted, and the base end portion 41A is fixed to the tilt bolt 40. Thus, a user such as a driver can hold a grip 41C of the operation member 41 on the side opposite from the base end portion 41A in the longitudinal direction thereof to operate the operation member 41. The tilt bolt 40 rotates integrally with the operation member 41 about the central axis 40A in accordance with operation of the operation member 41.

The cam 42 integrally includes an annular plate portion 42A and a tubular boss portion 42B. The plate portion 42A is adjacent to the base end portion 41A of the operation member 41 from the right side Y1. The boss portion 42B extends from the plate portion 42A toward the left side Y2. Into a space defined by the respective inner peripheral surfaces of the plate portion 42A and the boss portion 42B, the tilt bolt 40 is inserted. The boss portion 42B is inserted into the insertion hole 41B of the operation member 41. The cam 42 rotates integrally with the tilt bolt 40 and the operation member 41.

Figure 4:
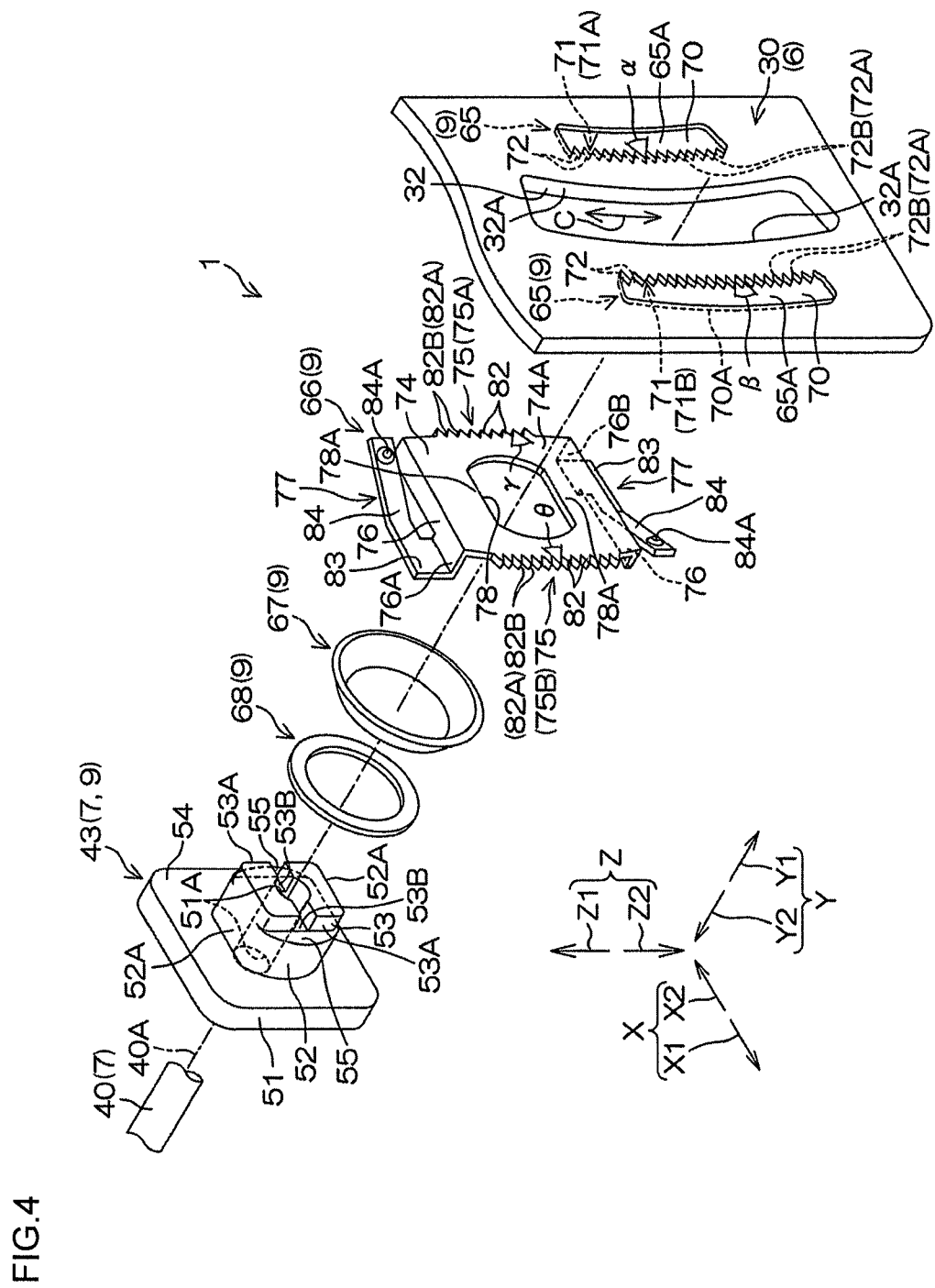
FIG. 4 is an exploded perspective view of a tilt locking mechanism on the left side.

FIG. 4 is an exploded perspective view of the tilt locking mechanism 9 on the left side Y2. In FIG. 4, the moving member 43 is a metallic sintered body, for example. The moving member 43 integrally includes a first pressing portion 51, a second pressing portion 52, and a boss portion 53. The first pressing portion 51 has a plate-like shape that is thin in the right-and-left direction Y, and is substantially rectangular when viewed from the right-and-left direction Y. In the substantial center of the first pressing portion 51 when viewed from the right-and-left direction Y, a circular through-hole 51A penetrating the first pressing portion 51 in the right-and-left direction Y is formed. The right side surface of the first pressing portion 51 is called "first pressing surface 54".

The second pressing portion 52 has a block-like shape protruding from the first pressing surface 54 toward the right side Y1, and is substantially circular when viewed from the right side Y1. On both sides of the second pressing portion 52 in the up-and-down direction Z, flat surfaces 52A that are flat along the axial direction X and the right-and-left direction Y are each formed. The right side surface of the second pressing portion 52 is called "second pressing surface 55". The second pressing surface 55 has a substantially semicircular shape protruding outward in the axial direction X, and a pair of the second pressing surfaces 55 are provided so as to be separate from each other in the axial direction X. The through-hole 51A of the first pressing portion 51 also penetrates, along the right-and-left direction Y, a portion of the second pressing portion 52 between the pair of the second pressing surfaces 55.

The boss portion 53 has a small piece-like shape protruding from the second pressing portion 52 between the pair of the second pressing surfaces 55 toward the right side Y1, and is substantially rectangular when viewed from the right side Y1. End surfaces 53A of the boss portion 53 on both sides in the axial direction X are flat along the tilt direction C, specifically the tangential direction to the tilt direction C. The flat surface 52A of the second pressing portion 52 on the upper side Z1 is flush with the upper end surface of the boss portion 53. The flat surface 52A of the second pressing portion 52 on the lower side Z2 is flush with the lower end surface of the boss portion 53. Hereinafter, the upper end surface and the lower end surface of the boss portion 53 are considered to be part of the flat surfaces 52A. The through-hole 51A of the first pressing portion 51 also penetrates the boss portion 53 along the right-and-left direction Y. In the right end surface of the boss portion 53, a notch 53B cutting out the boss portion 53 along the axial direction X is formed. The notch 53B is formed on both sides of the through-hole 51A in the axial direction X, and communicates with the through-hole 51A. Thus, the boss portion 53 is divided into upper and lower parts by the through-hole 51A and the notches 53B.

As seen in FIG. 3, into the through-hole 51A of the moving member 43, the left end portion of the tilt bolt 40 is inserted with a small clearance. The first pressing portion 51 of the moving member 43 is adjacent to the plate portion 42A of the cam 42 from the right side Y1. On the right side surface of the plate portion 42A and the left side surface of the first pressing portion 51, cam protrusions 56 are formed. The boss portion 53 of the moving member 43 is inserted into the tilt slot 32 of the side plate 30 on the left side Y2. The respective end surfaces 53A of the boss portion 53 on both sides in the axial direction X lie along a pair of edge portions 32A extending parallel to each other along the tilt direction C in the tilt slot 32 (see FIG. 4). This prevents idle rotation of the moving member 43 in the tilt slot 32 and corotation of the moving member 43 with the tilt bolt 40.

The pair of the second pressing surfaces 55 of the second pressing portion 52 of the moving member 43 are in contact with, from the left side Y2, peripheral portions of the tilt slot 32 at the left side surface of the side plate 30 on the left side Y2. To the thread groove 40C of the tilt bolt 40, the nut 44 is attached. Between the nut 44 and the side plate 30 on the right side Y1, the moving member 45, the annular needle roller bearing 46, and the thrust washer 47 are arranged in this order from the left side Y2.

The shape of the moving member 45 is substantially the same as the shape of the moving member 43, as the moving member 43 is flipped to the right side Y1 with respect to the reference plane 3D. However, unlike the moving member 43, the moving member 45 does not have the cam protrusion 56. Portions of the moving member 45 that correspond to the respective portions of the moving member 43 are denoted by the same reference characters, and detailed description of those portions is omitted. The right end portion of the tilt bolt 40 is inserted into each of the moving member 45, the needle roller bearing 46, and the thrust washer 47. Into the through-hole 51A of the moving member 45, the right end portion of the tilt bolt 40 is inserted with a small clearance. The boss portion 53 of the moving member 45 is inserted into the tilt slot 32 on the right side Y1. In the same manner as in the moving member 43, idle rotation of the moving member 45 in the tilt slot 32 and corotation of the moving member 45 with the tilt bolt 40 are prevented. The second pressing surfaces 55 of the second pressing portion 52 of the moving member 45 are in contact with, from the right side Y1, peripheral portions of the tilt slot 32 at the right side surface of the side plate 30 on the right side Y1.

In the tilt slots 32 of the right and left side plates 30 in the upper bracket 6, the tilt bolt 40 can move in the tilt direction C along the tilt slots 32 together with the respective boss portions 53 of the moving members 43 and 45. In the insertion holes 35 of the lower jacket 23 of the column jacket 4, the tilt bolt 40 can rotate about the central axis 40A but cannot move in the other directions. Thus, when the column jacket 4 is tilted for tilt adjustment, the tilt bolt 40 pivots in the tilt direction C together with the column jacket 4. In this manner, the upper bracket 6 supports the column jacket 4 via the tilt bolt 40 so that the column jacket 4 is pivotable. Tilt adjustment is performed within a movable range of the boss portions 53 in the tilt slots 32.

When the user operates and rotates the operation member 41 after telescopic adjustment and/or tilt adjustment, the cam 42 rotates, and the cam protrusions 56 of the cam 42 and the moving member 43 ride on each other. This causes the moving member 43 to move toward the right side Y1 along the tilt bolt 40 extending in the right-and-left direction Y, thereby pressing the second pressing surface 55 against the left side surface of the side plate 30 on the left side Y2 from the left side Y2. Accordingly, the moving member 45 is pulled along the tilt bolt 40 toward the left side Y2, and the second pressing surfaces 55 of the moving member 45 press the right side surface of the side plate 30 on the right side Y1 from the right side Y1. Thus, the distance between the moving member 43 and the moving member 45 in the right-and-left direction Y is narrowed, whereby the pair of the side plates 30 are clamped between the moving member 43 and the moving member 45 from both sides in the right-and-left direction Y. In this state, each extending portion 34 is frictionally held by the corresponding side plate 30, and the upper jacket 22 is frictionally held by the lower jacket 23 that is reduced in diameter by the clamping. This prevents rotation and extension/contraction of the column jacket 4, thereby preventing the steering member 11 (see FIG. 1) from moving in the tilt direction C and the axial direction X.

The state of the steering system 1 in which the position of the steering member 11 is locked in the tilt direction C and the axial direction X in this manner is called "locked state". The respective positions of the moving member 43 and the moving member 45 in the right-and-left direction Y in the locked state are called "locked positions". During normal driving, the steering system 1 is in the locked state. In the steering system 1 in the locked state, when the operation member 41 is operated to be rotated toward the direction opposite to that described above, the cam 42 rotates relatively to the moving member 43. This releases the riding of the cam protrusions 56 of the cam 42 and the moving member 43 on each other. Accordingly, the moving member 43 moves along the tilt bolt 40 from the locked position toward the left side Y2. In conjunction with this movement of the moving member 43, the moving member 45 moves along the tilt bolt 40 toward the right side Y1. This widens the distance between the moving member 43 and the moving member 45, thereby releasing the clamping of the pair of the side plates 30 between the moving member 43 and the moving member 45. In this state, the frictional holding between each side plate 30 and the corresponding extending portion 34 and the frictional holding between the lower jacket 23 and the upper jacket 22 are released. This allows rotation and extension/contraction of the column jacket 4, so that the steering member 11 can move in the tilt direction C and the axial direction X. Telescopic adjustment and tilt adjustment are thus enabled again.

The state of the steering system 1 in which the fixing of the position of the steering member 11 is released in the tilt direction C and the axial direction X is called "released state". The respective positions of the moving member 43 and the moving member 45 in the right-and-left direction Y in the released state are called "released positions". The telescopic locking mechanism 8 includes a tubular locking member 57, a transmission member 58, and a locking plate 59. The telescopic locking mechanism 8 firmly locks the position of the upper jacket 22 in the axial direction X by intermeshing between teeth 60 on the outer peripheral surface of the locking member 57 and teeth 61 of the locking plate 59, and releases this intermeshing to release the locking of the upper jacket 22. In the steering system 1 in the locked state, the position adjustment mechanism 7 locks the position of the upper jacket 22 in the axial direction X with frictional force. Intermeshing between the teeth 60 and the teeth 61 further enhances this locking.

The tilt locking mechanism 9 is a mechanism configured to, in the steering system 1 in the locked state, firmly lock the position of the column jacket 4 in the tilt direction C and release this locking. The tilt locking mechanism 9 is provided near each of the pair of the side plates 30. As seen in FIG. 4, the tilt locking mechanism 9 on the left side Y2 includes the moving member 43, a tooth engagement portion 65, a tooth member 66, an elastic member 67, and a spacer 68. The tooth engagement portion 65 is provided to the side plate 30 on the left side Y2.

The tooth engagement portion 65 is formed integrally with the side plate 30 on the left side Y2 by extrusion molding, for example, and protrudes from the left side surface of the side plate 30 on the left side Y2 toward the left side Y2. Thus, in FIG. 4, the tooth engagement portion 65 is positioned behind the side plate 30 on the left side Y2. On the right side surface of the side plate 30 on the left side Y2, as a mark of extrusion molding, a depression 65A the size of which is substantially the same as that of the tooth engagement portion 65 is formed. The tooth engagement portion 65 is formed in a pair so as to sandwich the tilt slot 32 from both sides in the axial direction X. The tooth engagement portions 65 each integrally have a holding portion 70 and a first tooth row 71. The holding portion 70 extends in a belt-like shape along the tilt direction C. The first tooth row 71 protrudes from the holding portion 70 toward the tilt slot 32. Because the pair of the tooth engagement portions 65 are arranged side by side in the axial direction X, the first tooth row 71 is formed in a pair arranged side by side in the axial direction X. The pair of the first tooth rows 71 include one first tooth row 71A and the other first tooth row 71B. The one first tooth row 71A is positioned on the front side X2 of the tilt slot 32. The other first tooth row 71B is positioned on the rear side X1 of the tilt slot 32. The first tooth row 71A is positioned closer to the central shaft 5C (see FIG. 1) of the lower bracket 5 that is a pivot axis of the column jacket 4, and the first tooth row 71B is positioned more distant from the central shaft 5C than the first tooth row 71A.

Figure 5:
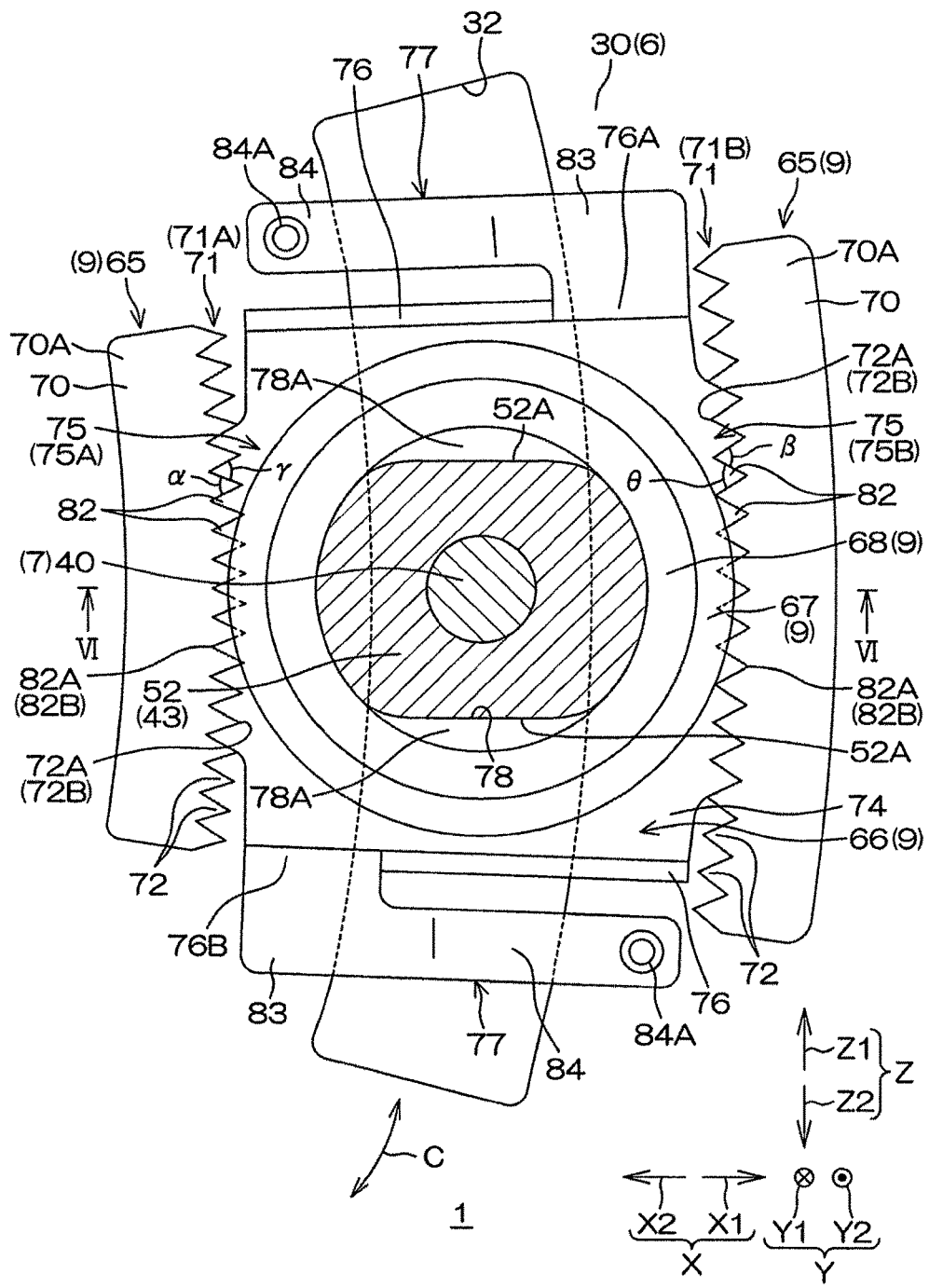
FIG. 5 is a sectional view along line V-V in FIG. 3.

FIG. 5 is a sectional view along line V-V in FIG. 3. As seen in FIG. 5, the left end surfaces of the holding portions 70 are engaged surfaces 70A that are flat in the axial direction X and the tilt direction C. Each first tooth row 71 includes a plurality of first teeth 72 that are arranged at regular intervals along the circular-arc-like tilt direction C. Each first tooth 72 is substantially triangular when viewed from the left side Y2, and has a tooth tip 72A that is directed to the tilt slot 32 side. Specifically, the tooth tip 72A of each first tooth 72 in the first tooth row 71A on the front side X2 is directed to the rear side X1 to face the tilt slot 32. The tooth tip 72A of each first tooth 72 in the first tooth row 71B on the rear side X1 is directed to the front side X2 to face the tilt slot 32. In each first tooth 72, a tooth trace 72B formed by the corresponding tooth tip 72A extends in the right-and-left direction Y (see also FIG. 8 described later). The left end surfaces of the first teeth 72 are each flush with the engaged surface 70A of the holding portion 70.

As seen in FIG. 4, each tooth member 66 is formed by processing one metal plate by press molding, for example. The tooth member 66 integrally includes a body portion 74, a pair of second tooth rows 75, a pair of ribs 76, and a pair of spring portions 77. The body portion 74 has a plate-like shape that is thin in the right-and-left direction Y, and has a substantially rectangular shape long in the tilt direction C. The right side surface of the body portion 74 is an engaging surface 74A that is flat in the axial direction X and the tilt direction C.

In the substantial center of the body portion 74 in the axial direction X and the up-and-down direction Z, a through-hole 78 penetrating the body portion 74 in the right-and-left direction Y is formed. When viewed from the right-and-left direction Y, the through-hole 78 has a substantially circular shape having substantially the same size as that of the second pressing portion 52 of the moving member 43. Thus, in the body portion 74, peripheral portions 78A define both ends of the through-hole 78 in the up-and-down direction Z. The peripheral portions 78A extend parallel to the flat surfaces 52A of the second pressing portion 52.

The second tooth rows 75 are each formed on both end edges of the body portion 74 in the axial direction X. Each second tooth row 75 includes a plurality of second teeth 82 that are arranged at regular intervals along the tilt direction C. Each second tooth 82 is substantially triangular when viewed from the right-and-left direction Y, and has a tooth tip 82A that is directed outward of the body portion 74 in the axial direction X. Specifically, in the second tooth row 75A on the front side X2 that is formed on the front end edge of the body portion 74, out of the pair of the second tooth rows 75, the tooth tip 82A of each second tooth 82 is directed to the front side X2. In the second tooth row 75B on the rear side X1 that is formed on the rear end edge of the body portion 74, the tooth tip 82A of each second tooth 82 is directed to the rear side X1. In each second tooth 82, a tooth trace 82B formed by the corresponding tooth tip 82A extends in the right-and-left direction Y (see also FIG. 8 described later). The left end surface of each second tooth 82 is part of the left side surface of the body portion 74, and the right end surface of each second tooth 82 is part of the engaging surface 74A of the body portion 74.

The pair of the ribs 76 are formed by bending both end portions of the body portion 74 in the up-and-down direction Z toward the left side Y2. Accordingly, each rib 76 is thin in the up-and-down direction Z, and extends long and narrow along the axial direction X. The pair of the spring portions 77 each have a support portion 83 and a deformation portion 84. The support portion 83 protrudes from each rib 76 so as to be separated from the body portion 74 in the up-and-down direction Z. The deformation portion 84 is supported by the support portion 83 and can elastically deform in the right-and-left direction Y. The support portion 83 of the spring portion 77 on the upper side Z1, out of the pair of the spring portions 77, extends from a rear end portion 76A of the rib 76 on the upper side Z1 toward the upper side Z1. The support portion 83 of the spring portion 77 on the lower side Z2 extends from a front end portion 76B of the rib 76 on the lower side Z2 toward the lower side Z2. Each support portion 83 is a plate-like shape that is thin in the right-and-left direction Y. The deformation portion 84 of the spring portion 77 on the upper side Z1 extends from the front end portion of the support portion 83 obliquely toward the front side X2 and the right side Y1. The deformation portion 84 of the spring portion 77 on the lower side Z2 extends from the rear end portion of the support portion 83 on the lower side Z2 obliquely toward the rear side X1 and the right side Y1. On a distal end portion of each deformation portion 84, a contact portion 84A is formed having a projecting shape pressed out toward the right side Y1.

Figure 6:
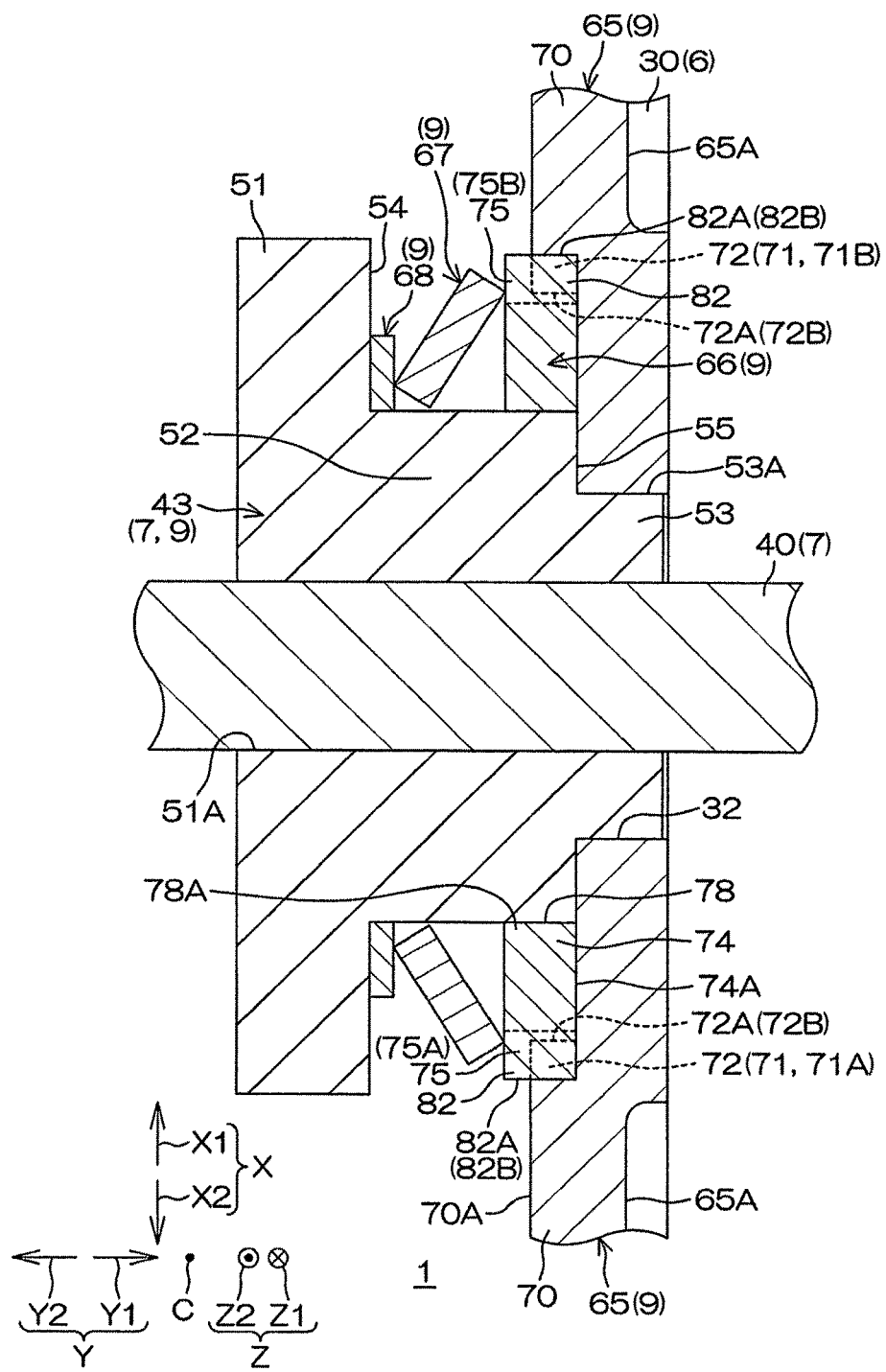
FIG. 6 is a sectional view along line VI-VI in FIG. 5.

The tooth member 66 is disposed between the first pressing portion 51 of the moving member 43 and the side plate 30 on the left side Y2. As seen in FIG. 6 that is a sectional view along line VI-VI in FIG. 5, into the through-hole 78 of the body portion 74 of the tooth member 66, the second pressing portion 52 of the moving member 43 is inserted. In this state, the tooth member 66 can move relatively to the second pressing portion 52 in the right-and-left direction Y. However, because the through-hole 78 has substantially the same size as that of the second pressing portion 52 as described above, rotation of the tooth member 66 relative to the moving member 43 is restricted.

The engaging surface 74A of the body portion 74 in the tooth member 66 faces an area, in the left side surface of the side plate 30 on the left side Y2, between the pair of the first tooth rows 71 (see FIG. 4). The contact portions 84A of the spring portions 77 of the tooth member 66 are in contact with the left side surface of the side plate 30 on the left side Y2 from the left side Y2 (see FIG. 5). The elastic member 67 is a coned disc spring, for example. In FIG. 6, the elastic member 67 has a substantially annular shape that widens in the radial direction of the tilt bolt 40 toward the right side Y1. Alternatively, the elastic member 67 may have a substantially annular shape that widens in the radial direction toward the left side Y2.

Into the hollow portion of the elastic member 67, the second pressing portion 52 of the moving member 43 is inserted. The elastic member 67 is disposed between the tooth member 66 and the first pressing portion 51 of the moving member 43. The inner peripheral edge of the left end portion of the elastic member 67 lies along portions in the outer peripheral surface of the second pressing portion 52 other than the flat surfaces 52A (see FIG. 4). The right end portion of the elastic member 67 is in contact with the left side surface of the body portion 74 of the tooth member 66 and part of the second tooth rows 75 (see FIG. 5).

The spacer 68 is a metallic sintered body, for example, having an annular shape that is thin in the right-and-left direction Y (see FIG. 4). The spacer 68 is fit onto the second pressing portion 52 of the moving member 43 from the right side Y1. The inner peripheral surface of the spacer 68 lies along portions in the outer peripheral surface of the second pressing portion 52 other than the flat surfaces 52A (see FIG. 5). The spacer 68 is disposed between the first pressing portion 51 of the moving member 43 and the elastic member 67. The left side surface of the spacer 68 is in surface contact with the first pressing surface 54 of the first pressing portion 51 from the right side Y1. The entire area of the right side surface of the spacer 68 in the circumferential direction is in contact with the left end portion of the elastic member 67 from the left side Y2.

As described above, the tilt bolt 40 that can pivot together with the column jacket 4 in the tilt direction C is inserted into the through-hole 51A of the moving member 43. The second pressing portion 52 of the moving member 43 is inserted into the tooth member 66, the elastic member 67, and the spacer 68. Thus, during tilt adjustment, the tooth member 66, the elastic member 67, and the spacer 68 pivot together with the column jacket 4 in the tilt direction C.

As seen in FIG. 3, the tilt locking mechanism 9 on the right side Y1 includes the moving member 45 instead of the moving member 43. The tilt locking mechanism 9 on the right side Y1 includes the tooth engagement portion 65, the tooth member 66, the elastic member 67, and the spacer 68 in the same manner as the tilt locking mechanism 9 on the left side Y2. Each of the moving member 45, the tooth engagement portions 65 (not depicted), the tooth member 66, the elastic member 67, and the spacer 68 of the tilt locking mechanism 9 on the right side Y1 and each of the moving member 43, the tooth engagement portions 65, the tooth member 66, the elastic member 67, and the spacer 68 of the tilt locking mechanism 9 on the left side Y2 are disposed symmetrically with respect to the reference plane 3D.

The following describes operation of the tilt locking mechanism 9 on the left side Y2. The operation of the tilt locking mechanism 9 on the right side Y1 is almost the same as the operation of the tilt locking mechanism 9 on the left side Y2 except that the right-and-left orientation is reversed. Operation of the tilt locking mechanism 9 when the steering system 1 is changed into the locked state will be described first. In FIG. 5 and FIG. 6, the steering system 1 in the locked state is illustrated. In the following description, unless otherwise mentioned, it is assumed that, in a stage before the steering system 1 is changed into the locked state, the first teeth 72 of the first tooth rows 71 and the second teeth 82 of the second tooth rows 75 are positioned so that the phases thereof match each other and thus these teeth do not overlap each other when viewed from the right-and-left direction Y.

When the operation member 41 (see FIG. 3) is operated to change the steering system 1 into the locked state, the moving member 43 moves toward right side Y1 from the released position to the locked position. The tooth member 66 is caused to move toward the right side Y1 by the first pressing portion 51 of the moving member 43 via the spacer 68 and the elastic member 67. Consequently, when the steering system 1 has been changed into the locked state, as depicted in FIG. 5 and FIG. 6, the tooth member 66 reaches the area between the pair of the first tooth rows 71 on the left side surface of the side plate 30 on the left side Y2 in the upper bracket 6. Thus, the second tooth rows 75 of the tooth member 66 become close to the first tooth rows 71, and the engaging surface 74A of the body portion 74 of the tooth member 66 (see FIG. 6) comes into surface contact with the left side surface of the side plate 30 on the left side Y2. In this state, the first teeth 72 of the first tooth row 71A on the front side X2 in the side plate 30 and the second teeth 82 of the second tooth row 75A on the front side X2 in the tooth member 66 mesh with each other alternately arranged in the tilt direction C. The first teeth 72 of the first tooth row 7113 on the rear side X1 and the second teeth 82 of the second tooth row 75B on the rear side X1 mesh with each other alternately arranged in the tilt direction C.

Thus, the pair of the first tooth rows 71 and the pair of the second tooth rows 75 intermesh with each other. Accordingly, in this state, the column jacket 4 that moves integrally with the tooth member 66 cannot pivot, so that the position of the column jacket 4 in the tilt direction C is fixed. Thus, in the locked state, by frictional holding between each extending portion 34 of the lower jacket 23 and the corresponding side plate 30 of the upper bracket 6, and intermeshing between the first tooth rows 71 and the second tooth rows 75, the position of the upper jacket 22 in the tilt direction C is more firmly locked.

In the locked state, the deformation portions 84 of the spring portions 77 of the tooth member 66 are pressed against the side plates 30 to elastically deform in the right-and-left direction Y. Accordingly, by restoring force of the deformation portions 84 returning to their original state, the entire tooth member 66 is biased toward the elastic member 67 on the left side Y2 as depicted in FIG. 6. The elastic member 67 is sandwiched by the tooth member 66 and the first pressing portion 51 of the moving member 43 to be compressed in the right-and-left direction Y, whereby the restoring force returning to the original state is generated.

It is assumed in FIG. 1 that, in the event of a vehicle collision, after a primary collision in which a vehicle collides with an obstacle, a secondary collision occurs in which a driver collides with the steering member 11. In the secondary collision, by reaction force that is generated by deployment of an airbag mounted in the steering member 11 and collision of the driver with the airbag, the steering member 11 receives an impact in the axial direction X and the tilt direction C. In the tilt direction C in particular, the steering member 11 attempts to move upward together with the column jacket 4. However, in the steering system 1, the position of the column jacket 4 in the axial direction X and the tilt direction C is maintained by the position adjustment mechanism 7 and, in addition, the positions of the column jacket 4 and the steering member 11 in the tilt direction C are firmly maintained by the tilt locking mechanism 9. Thus, in the secondary collision, free movement of the column jacket 4 in an initial stage in particular can be suppressed, and the position of the airbag in the tilt direction C can be maintained properly. When the steering member 11 moves toward the front side X2 so as to absorb the impact in the secondary collision, the steering member 11 can be caused to move forward in a stable attitude. This can stabilize detachability in the secondary collision. Maintaining the position of the column jacket 4 by the tilt locking mechanism 9 as described above is called "positive locking".

Figure 7:
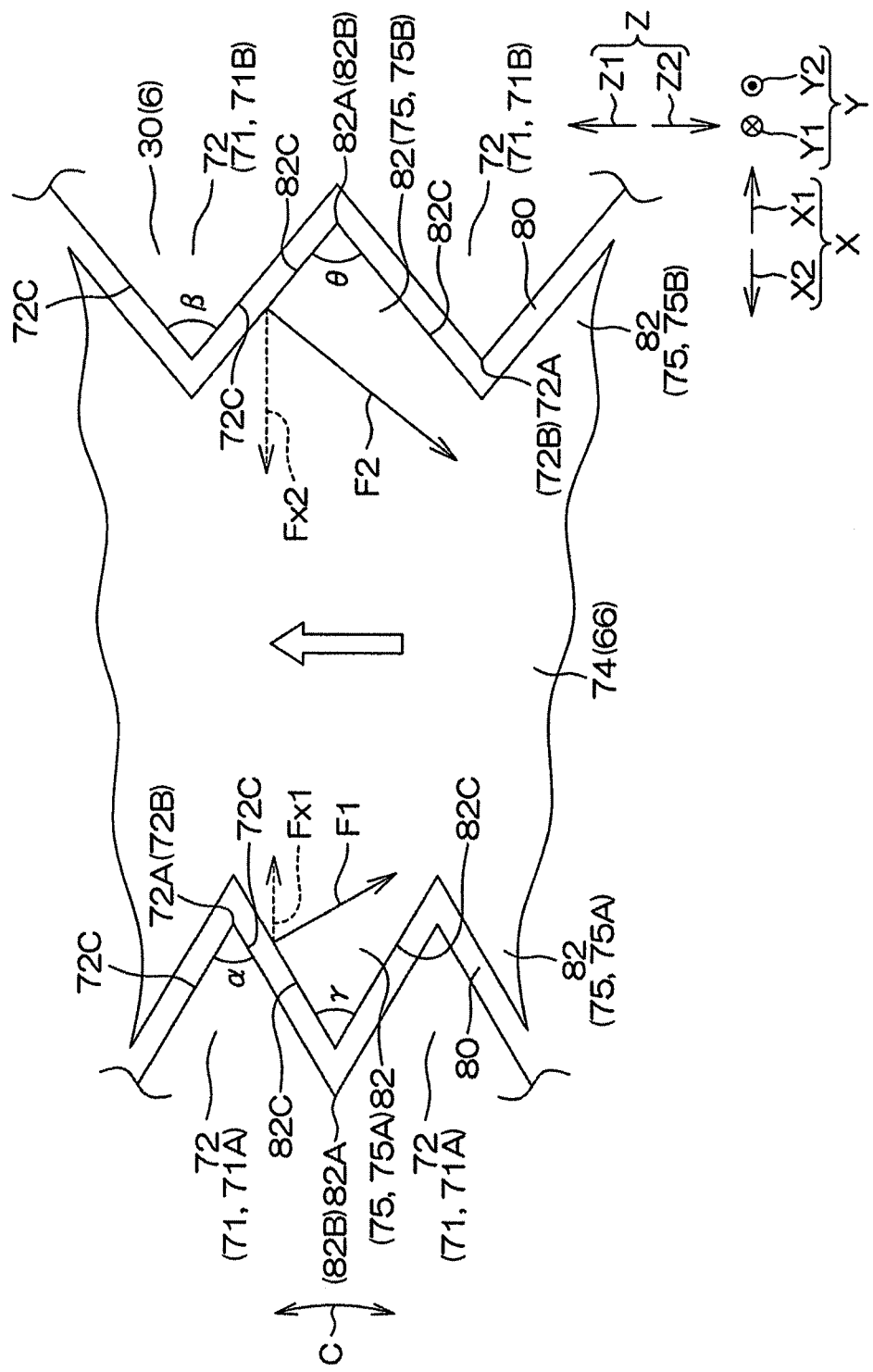
FIG. 7 is a schematic diagram illustrating first tooth rows and second tooth rows that mesh with each other.

FIG. 7 is a schematic diagram illustrating the first tooth rows 71 and the second tooth rows 75 that mesh with each other. As seen in FIG. 7, when the column jacket 4 attempts to move upward in the secondary collision as described above, the tooth member 66 also attempts to move upward as indicated by the white arrow. Even under normal conditions other than the secondary collision, for example, when the user exerts a strong upward force on the steering member 11, the column jacket 4 and the tooth member 66 attempt to move upward.

When the tooth member 66 is about to move upward, each second tooth 82 of the second tooth row 75A on the front side X2 in the tooth member 66, at a tooth flank 82C thereof, receives a reaction force F1 from the corresponding first tooth 72 of the first tooth row 71A on the front side X2. Each second tooth 82 of the second tooth row 75B on the rear side X1 in the tooth member 66, at a tooth flank 82C thereof, receives a reaction force F2 from the corresponding first tooth 72 of the first tooth row 71B on the rear side X1. The directions of the reaction forces F1 and F2 are substantially orthogonal to the respective tooth flanks 82C. The component force Fx1 of the reaction force F1 in the axial direction X is directed to the rear side X1, and the component force Fx2 of the reaction force F2 in the axial direction X is directed to the front side X2.

Herein, the tooth tip angle α of each first tooth 72 in the first tooth row 71A on the front side X2 that is closer to the central shaft 5C is different from the tooth tip angle β of each first tooth 72 in the first tooth row 71B on the rear side X1 that is closer to the steering member 11. The tooth tip angles α and β are each an intersecting angle between each pair of tooth flanks 72C that become closer to each other toward the tooth tip 72A of the first tooth 72. This difference between the tooth tip angle α and the tooth tip angle β causes a difference between the component force Fx1 and the component force Fx2 in the state in which the pair of the first tooth rows 71 and the pair of the second tooth rows 75 intermesh with each other. Accordingly, the tooth member 66 is biased in the axial direction X. This reduces backlash between the first teeth 72 and the second teeth 82, thereby causing the first teeth 72 and the second teeth 82 to firmly mesh with each other. Consequently, meshing strength between the first teeth 72 and the second teeth 82 can be increased, in other words, strength of the positive locking can be increased.

When the first teeth 72 are arranged in each of the pair of the first tooth rows 71 along the tilt direction C, the pitch of the first teeth 72 in the first tooth row 71A that is closer to the central shaft 5C is smaller than the pitch of the first teeth 72 in the first tooth row 71B that is more distant from the central shaft 5C than the first tooth row 71A. In this case, as the pitch of the first teeth 72 decreases, the contact area between the first teeth 72 and the second teeth 82 that mesh with each other decreases. Thus, the meshing strength between the first teeth 72 of the first tooth row 71A and the second teeth 82 of the second tooth row 75A is lower than the meshing strength between the first teeth 72 of the first tooth row 71B and the second teeth 82 of the second tooth row 75B. Thus, the strength of the positive locking is determined by the meshing strength between the first teeth 72 of the first tooth row 71A and the second teeth 82 of the second tooth row 75A. However, because of dimensional tolerances, clearance 80 is inevitably generated between the first teeth 72 and the second teeth 82 that mesh with each other, and the backlash due to this clearance 80 may reduce the meshing strength. Meanwhile, reduction in the backlash by increasing the dimensional accuracy of the first teeth 72 and the second teeth 82 may increase the cost.

In view of this, the tooth tip angle α of the first teeth 72 in the first tooth row 71A is set to be smaller than the tooth tip angle β of the first teeth 72 in the first tooth row 71B. For example, when the tooth tip angle α is 60 degrees, the tooth tip angle β is 70 degrees. By setting the tooth tip angle α to be smaller than the tooth tip angle β, the component force Fx1 in the axial direction X that the second teeth 82 receive from the first teeth 72 of the first tooth row 71A becomes smaller than the component force Fx2 in the axial direction X that the second teeth 82 receive from the first teeth 72 of the first tooth row 71B. Accordingly, by the difference between the component force Fx1 and the component force Fx2, the tooth member 66 is biased toward the central shaft 5C side (front side X2) in the axial direction X. This reduces the backlash between the first teeth 72 of the first tooth row 71A and the second teeth 82 of the second tooth row 75A, so that the first teeth 72 and the second teeth 82 firmly mesh with each other. Consequently, the contact ratio between the first teeth 72 of the first tooth row 71A and the second teeth 82 of the second tooth row 75A increases, and thus the meshing strength between the first teeth 72 and the second teeth 82 can be increased.

Without increasing the dimensional accuracy of the first teeth 72 and the second teeth 82, the meshing strength can be increased by only setting the difference between the tooth tip angle α and the tooth tip angle β to reduce the backlash as described above, and thus the cost can be prevented from increasing. Because the tooth tip angle β is set to be larger than the tooth tip angle α, the contact area between the first teeth 72 of the first tooth row 71B and the second teeth 82 of the second tooth row 75B on the rear side X1 is relatively large. Thus, the meshing strength between the first teeth 72 and the second teeth 82 is sufficiently obtained.

The tooth tip angle γ of the second teeth 82 of the second tooth row 75A that mesh with the first teeth 72 of the first tooth row 71A and the tooth tip angle θ of the second teeth 82 of the second tooth row 75B that mesh with the first teeth 72 of the first tooth row 71B may be set to be different as in the relationship between the tooth tip angles α and β. The tooth tip angles γ and θ are each an intersecting angle between each pair of tooth flanks 82C that become closer to each other toward the tooth tip 82A of the corresponding second tooth 82. As described above, when the tooth tip angle α is set to be smaller than the tooth tip angle β, the tooth tip angle γ only needs to be set to be smaller than the tooth tip angle θ. The tooth tip angle α and the tooth tip angle γ are preferably equal, and in the same manner, the tooth tip angle β and the tooth tip angle θ are preferably equal.

Figure 8:
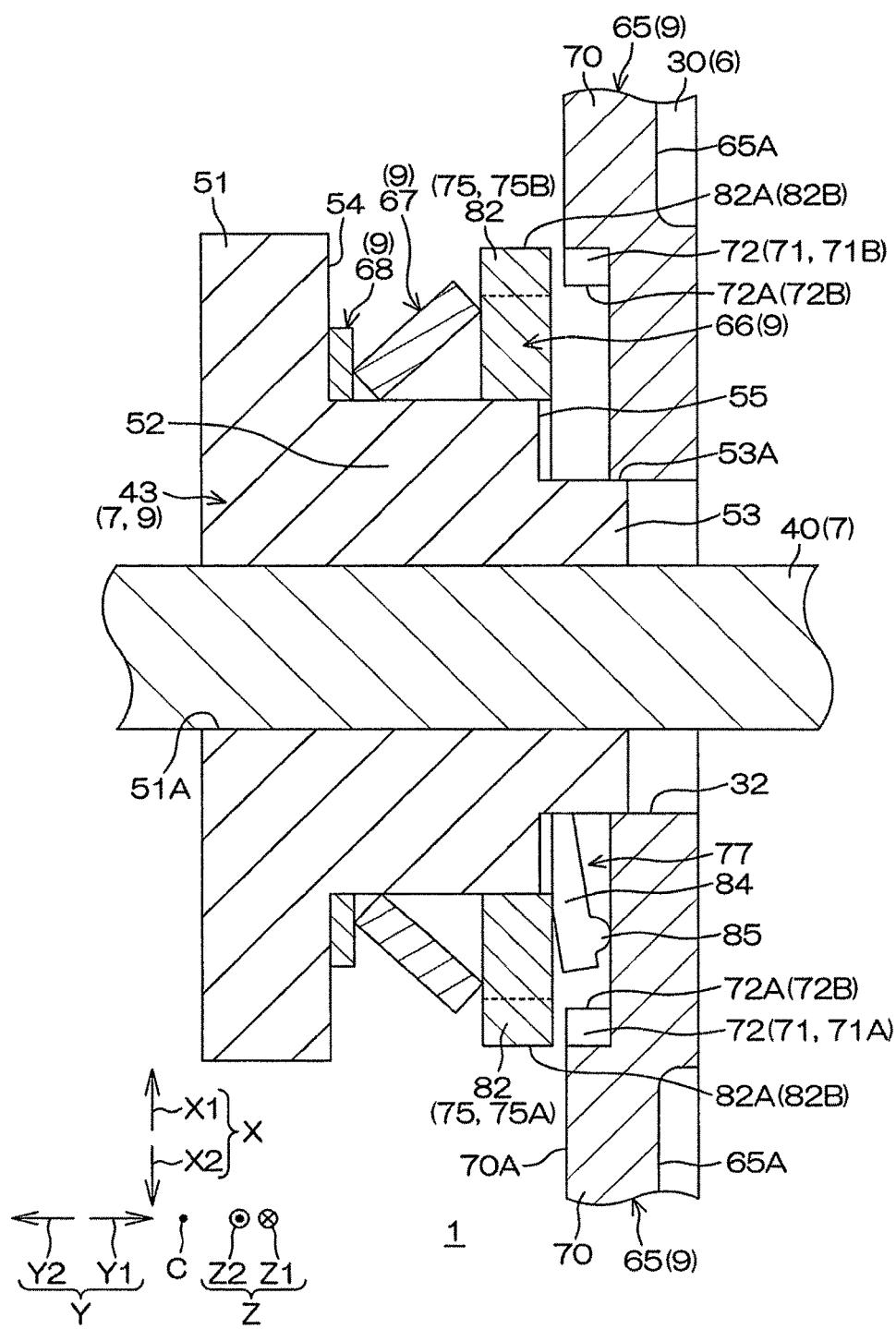
FIG. 8 is a diagram illustrating a released state of the steering system 1 in FIG. 6.

The following describes operation of the tilt locking mechanism 9 when the steering system 1 is changed from the locked state into the released state. The following refers to also FIG. 8 illustrating the released state of the steering system 1 in FIG. 6. When the operation member 41 is operated to change the steering system 1 into the released state, the moving member 43 moves from the locked position toward the left side Y2. When the moving member 43 moves toward the left side Y2, the distance between the tooth member 66 and the first pressing portion 51 of the moving member 43 increases, and accordingly the compressed amount of the elastic member 67 in the right-and-left direction Y gradually decreases. When the steering system 1 has been changed into the released state as depicted in FIG. 8, the elastic member 67 becomes uncompressed.

As described above, when the steering system 1 is in the locked state, the deformation portions 84 of the spring portions 77 of the tooth member 66 are elastically deformed. Accordingly, the entire tooth member 66 is biased toward the left side Y2 by the restoring force of the deformation portions 84. When the moving member 43 is moved toward the left side Y2 and the elastic member 67 accordingly becomes uncompressed to change the steering system 1 into the released state, the tooth member 66 moves toward the left side Y2 by the restoring force of the deformation portions 84. Accordingly, the second tooth rows 75 of the tooth member 66 also move toward the left side Y2. Thus, when the steering system 1 has been changed into the released state, the second tooth rows 75 has moved to be positioned more toward the left side Y2 than the first tooth rows 71. This releases the intermeshing between the second tooth rows 75 and the first tooth rows 71. The position of the moving member 43 in the right-and-left direction Y at this time is called "released position".

Figure 9:
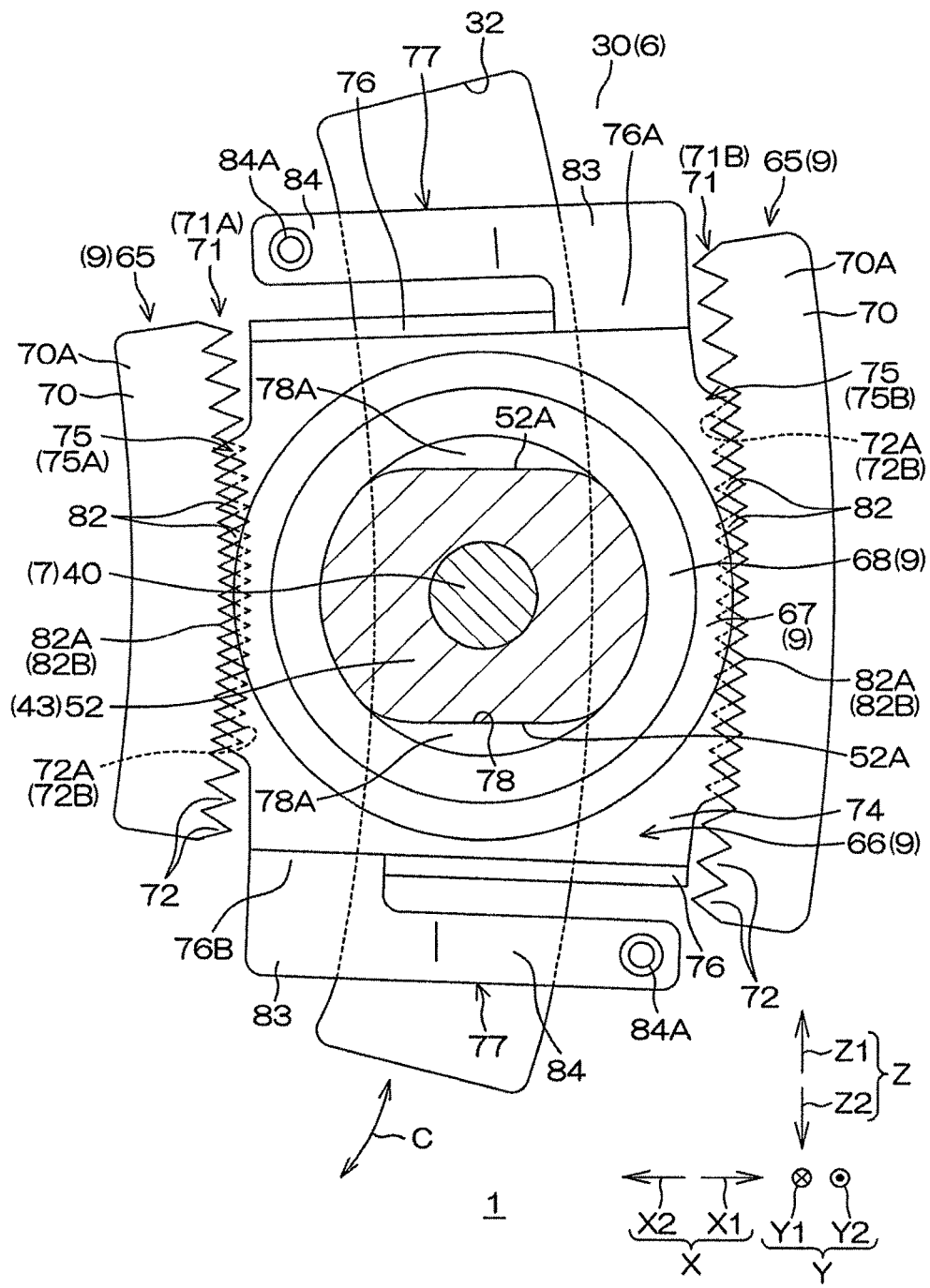
FIG. 9 is a diagram illustrating a state in which the second tooth rows are riding on the first tooth rows in FIG. 5.

As described above, in the released state, the frictional force between the side plates 30 of the upper bracket 6 and the extending portions 34 of the lower jacket 23 disappears. Thus, in the released state, locking of the position of the column jacket 4 in the tilt direction C is completely released. This allows tilt adjustment of the steering member 11. FIG. 9 is a diagram illustrating a state in which the second tooth rows 75 ride on the first tooth rows 71 in FIG. 5. The following assumes a case in which the user operates the operation member 41 so as to change the steering system 1 into the locked state, with the second tooth rows 75 riding on the first tooth rows 71. In the state in which the second tooth rows 75 are riding on the first tooth rows 71, as depicted in FIG. 9, the first teeth 72 and the second teeth 82 overlap each other when viewed from the right-and-left direction Y due to the unmatched phases. Thus, so-called a tooth-on-tooth position occurs, in which the first tooth rows 71 and the second tooth rows 75 do not mesh with each other and the second tooth rows 75 ride on the first tooth rows 71. The state of the steering system 1 in which the tooth-on-tooth position occurs is called "tooth-on-tooth state".

In the tooth-on-tooth state, in the same manner as in the locked state, the position of the column jacket 4 is locked by the position adjustment mechanism 7 (see FIG. 1). The steering member 11 is locked at the position where tilt adjustment has been completed. Thus, regardless of whether the first tooth rows 71 and the second tooth rows 75 mesh with each other, tilt adjustment can be performed steplessly within a range in which the boss portion 53 of the moving member 43 can move in the tilt slot 32.

In the tooth-on-tooth state, the position of the column jacket 4 in the tilt direction C is locked mainly by the frictional force between the side plate 30 and the extending portion 34. Thus, when impact caused by a secondary collision, for example, exceeds the frictional force, the column jacket 4 attempts to pivot in the tilt direction C. In this case, when the column jacket 4 pivots in the tilt direction C by an amount equivalent to about one half of the pitch of the first teeth 72 and the second teeth 82, the first teeth 72 of the first tooth rows 71 and the second teeth 82 of the second tooth rows 75 are alternately arranged in the tilt direction C. This prevents the second tooth rows 75 from riding on the first tooth rows 71. The tooth member 66 having the second tooth rows 75 receives the restoring force of the elastic member 67 that is compressed in the right-and-left direction Y. Thus, the tooth member 66 moves toward the side plate 30 of the upper bracket 6, and the first tooth rows 71 and the second tooth rows 75 mesh with each other. Thus, the steering system 1 is changed from the tooth-on-tooth state into the locked state. Consequently, by the positive locking, pivoting of the column jacket 4 in the tilt direction C can be prevented.

By the combination of the elastic member 67 using a coned disc spring and the spacer 68, the restoring force can be kept substantially constant. This enables the user to operate the operation member 41 smoothly without feeling heaviness during the entire operation even with the second tooth rows 75 riding on the first tooth rows 71. Needless to say, the elastic member 67 and the spacer 68 may be omitted as necessary.

The present invention is not limited to the embodiment described above, and various modifications may be made within the scope of the claims. For example, in the embodiment, the first tooth rows 71 are formed integrally with each side plate 30 of the upper bracket 6 as part of the corresponding tooth engagement portions 65 so as to be supported by the upper bracket 6. Alternatively, the first tooth rows 71 may be formed separately from the side plate 30. The tooth member 66 having the second tooth rows 75 may be formed integrally with the moving member 43 and the moving member 45. Regarding these modifications, the following describes a first modification to a third modification of the tilt locking mechanisms 9. In the following description, the tilt locking mechanism 9 on the left side Y2 will be described. The structure of the tilt locking mechanism 9 on the right side Y1 is the same as that of the tilt locking mechanism 9 on the left side Y2.

Figure 10:
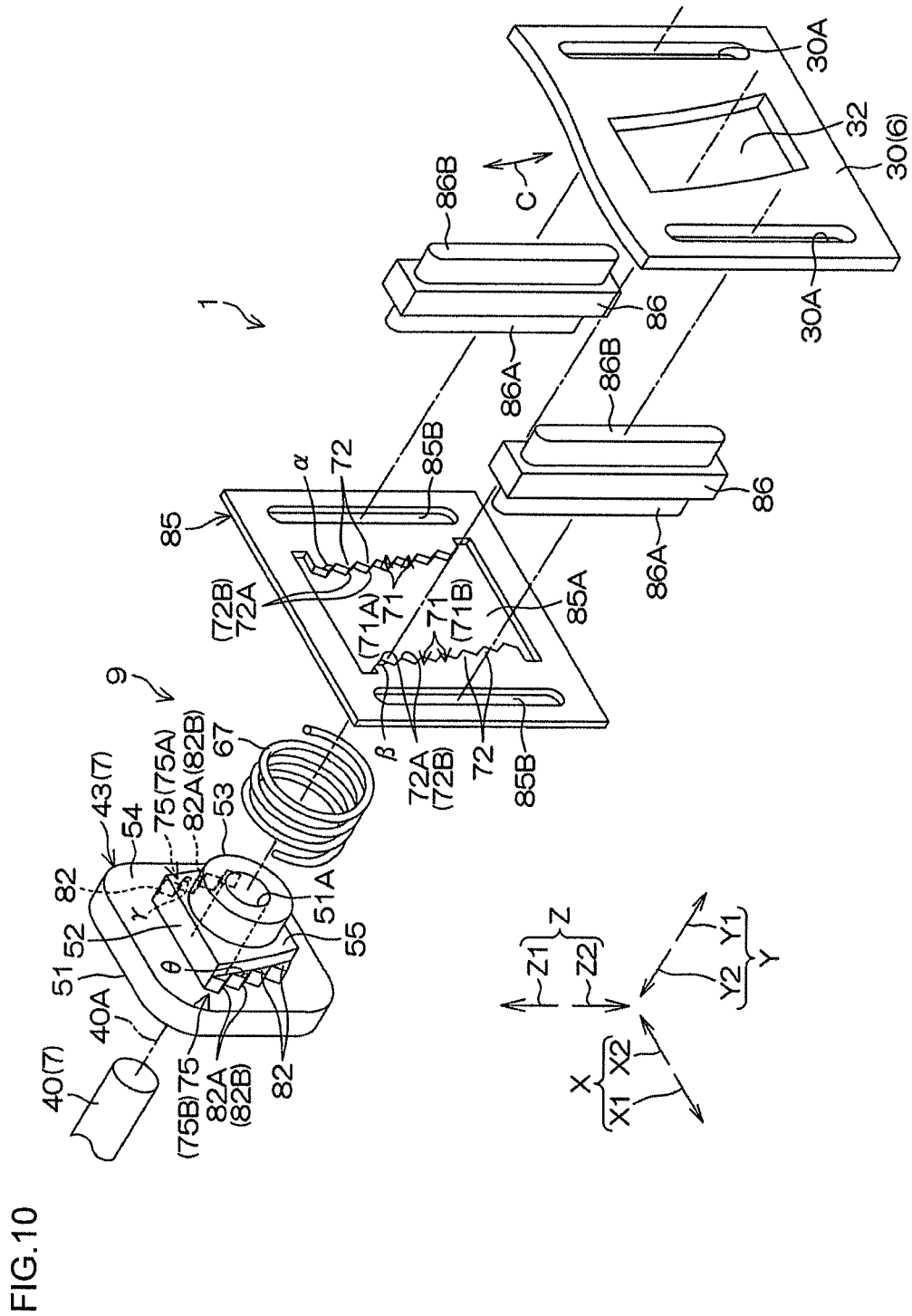
FIG. 10 is an exploded perspective view of a tilt locking mechanism according to a first modification.

FIG. 10 is an exploded perspective view of a tilt locking mechanism according to the first modification. In FIG. 10 and later-described FIGS. 11 and 12, members that are the same as the members described in the foregoing are denoted by the same reference characters, and description thereof is omitted. In the first modification, as a member separated from a side plate 30, a tooth member 85 is provided. The tooth member 85 is a metal plate that is substantially rectangular when viewed from the right-and-left direction Y and is thin in the right-and-left direction Y In the substantial center of the tooth member 85 when viewed from the right-and-left direction Y, a guide slot 85A penetrating the tooth member 85 in the right-and-left direction Y is formed. The guide slot 85A extends along the tilt direction C. A pair of first tooth rows 71 are formed integrally with the tooth member 85 so as to rim both sides of the guide slot 85A in the axial direction X. In the same manner as in the embodiment, in each first tooth row 71, a plurality of first teeth 72 are arranged at regular intervals along the tilt direction C.

Tooth tips 72A of the first teeth 72 of the first tooth row 71A on the front side X2 are exposed to the guide slot 85A toward the rear side X1. Tooth tips 72A of the first teeth 72 of the first tooth row 71B on the rear side X1 are exposed to the guide slot 85A toward the front side X2. The first teeth 72 in either row have tooth traces 72B extending along the right-and-left direction Y. On both outer sides of the guide slot 85A in the axial direction X in the tooth member 85, insertion slots 85B extending straight along the up-and-down direction Z and penetrating the tooth member 85 in the right-and-left direction Y are each formed.

Insertion slots 30A each having substantially the same shape as that of each insertion slot 85B are each formed on both outer sides of the tilt slot 32 in the axial direction X in the side plate 30 on the left side Y2. The insertion slots 30A extend straight along the up-and-down direction Z and penetrate the side plate 30 on the left side Y2 in the right-and-left direction Y. Along the insertion slots 85B and 30A, a pair of long block-like support members 86 are provided. Projecting portions 86A formed on the left side surfaces of the support members 86 are inserted into the insertion slots 85B from the right side Y1. Projecting portions 86B formed on the right side surfaces of the support members 86 are inserted into the insertion slots 30A from the left side Y2. Consequently, the tooth member 85 is supported by the side plate 30 on the left side Y2 via the support members 86. The tooth member 85 is positioned separated from the side plate 30 on the left side Y2 toward the left side Y2, and the guide slot 85A overlap the tilt slot 32 when viewed from the right-and-left direction Y. The tooth member 85 has elasticity, and thus the first tooth row 71A can elastically deform in the right-and-left direction Y. The support members 86 may be members separated from the side plate 30, or may be formed integrally with the side plate 30.

The tooth member 66 (see FIG. 4) is omitted, and the pair of the second tooth rows 75 in the tooth member 66 are formed on a moving member 43. Thus, in the first modification, the moving member 43 also serves as the tooth member 66. The second tooth rows 75 in this case are formed integrally with the moving member 43 on both side surfaces of a second pressing portion 52 in the axial direction X. In the same manner as in the embodiment, in each second tooth row 75, a plurality of second teeth 82 are arranged at regular intervals along the tilt direction C. Tooth tips 82A of the second teeth 82 of the second tooth row 75A on the front side X2 are directed to the front side X2. Tooth tips 82A of the second teeth 82 of the second tooth row 75B on the rear side X1 are directed to the rear side X1. The second teeth 82 in either row have tooth traces 82B extending along the right-and-left direction Y.

This tilt locking mechanism 9 of the first modification may be different in detail from the tilt locking mechanism 9 of the embodiment. For example, in the tilt locking mechanism 9 of the first modification, the boss portion 53 of the moving member 43 is formed in a cylindrical shape, and is inserted into the guide slot 85A of the tooth member 85 and the tilt slot 32 of the side plate 30. The elastic member 67 is a coil spring that is fitted onto the boss portion 53 and the tilt bolt 40, and is inserted into the guide slot 85A and the tilt slot 32. The elastic member 67 is compressed between the second pressing portion 52 of the moving member 43 and the extending portion 34 on the left side Y2 in the lower jacket 23 (see FIG. 3), thereby generating a restoring force described above. In the first modification, the spacer 68 may be omitted.

In the first modification, when the operation member 41 is operated to change the steering system 1 into the locked state, the moving member 43 moves toward the right side Y1 from the released position to the locked position. When the steering system 1 has been changed into the locked state, the second pressing portion 52 of the moving member 43 that has reached the locked position reaches the inside of the guide slot 85A of the tooth member 85, that is, an area between the pair of the first tooth rows 71. In this state, the first teeth 72 of the first tooth row 71A on the front side X2 and the second teeth 82 of the second tooth row 75A on the front side X2 in the moving member 43 mesh with each other alternately arranged in the tilt direction C. The first teeth 72 of the first tooth row 71B on the rear side X1 and the second teeth 82 of the second tooth row 75B on the rear side X1 mesh with each other alternately arranged in the tilt direction C. In this manner, the pair of the first tooth rows 71 and the pair of the second tooth rows 75 intermesh with each other.

When the operation member 41 is operated in the opposite direction to change the steering system 1 from the locked state into the released state, the moving member 43 moves from the locked position toward the left side Y2 and reaches the released position. At this time, by the restoring force of the elastic member 67, movement of the moving member 43 to the released position is facilitated. When the steering system 1 has been changed into the released state, the second tooth rows 75 move toward the left side Y2 relatively to the first tooth row 71, so that the intermeshing between the second tooth rows 75 and the first tooth rows 71 is released.

When the operation member 41 is operated to change the steering system 1 into the locked state with the second tooth rows 75 riding on the first tooth rows 71, the first tooth rows 71 is pressed by the second tooth rows 75. This causes the first tooth rows 71 to elastically deform toward the side plate 30 on the left side Y2. Thus, the steering system 1 is changed into the tooth-on-tooth state. In the first modification also, the tooth tip angle α of each first tooth 72 in the first tooth row 71A on the front side X2 in the pair of the first tooth rows 71 is different from the tooth tip angle β of each first tooth 72 in the first tooth row 71B on the rear side X1. The tooth tip angle α is preferably set to be smaller than the tooth tip angle β. Accordingly, in a secondary collision, for example, the moving member 43 is biased toward the front side X2, which reduces backlash between the first teeth 72 of the first tooth row 71A and the second teeth 82 of the second tooth row 75A. Thus, the meshing strength between the first teeth 72 and the second teeth 82 can be increased as described above.

Figure 11:
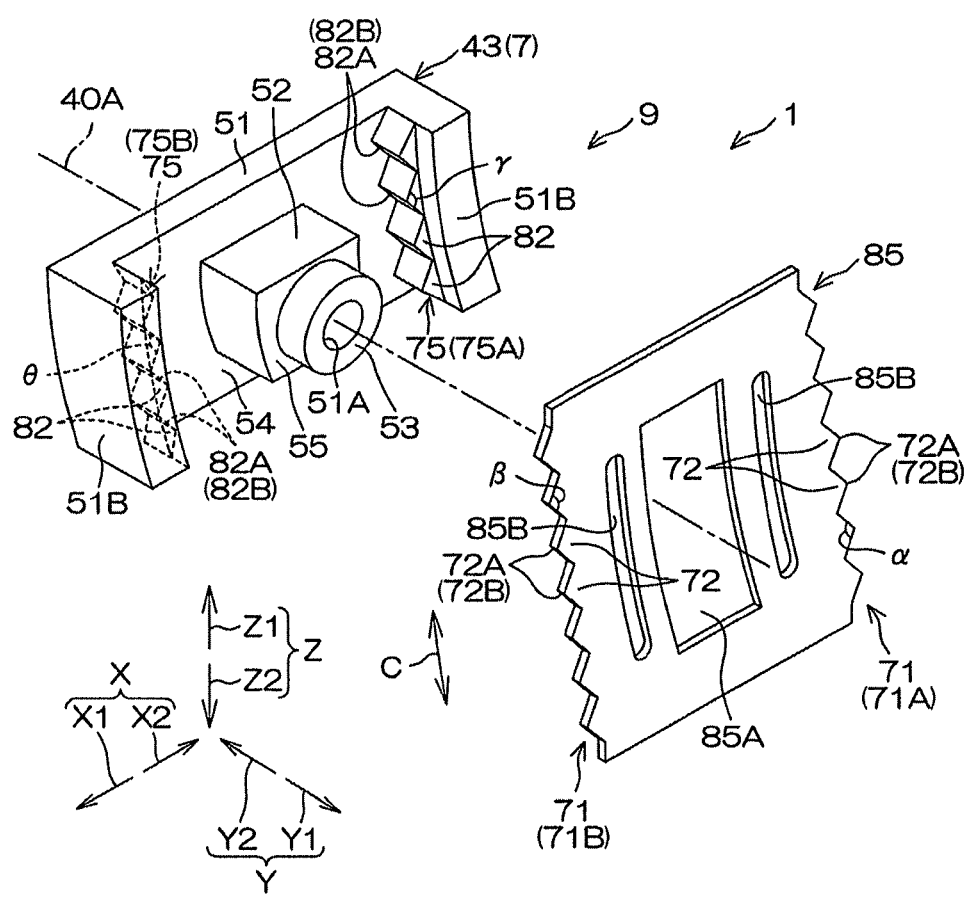
FIG. 11 is an exploded perspective view of a tilt locking mechanism according to a second modification.

FIG. 11 is an exploded perspective view of a tilt locking mechanism 9 according to the second modification. The tilt locking mechanism 9 according to the second modification is different in detail from the tilt locking mechanism 9 according to the first modification. Specifically, in the tilt locking mechanism 9 according to the second modification, a pair of first tooth rows 71 are not positioned so as to rim a guide slot 85A, but are formed integrally with a tooth member 85 on its both side edges in the axial direction X. In each first tooth row 71, a plurality of first teeth 72 are arranged at regular intervals along the tilt direction C. Tooth tips 72A of the first teeth 72 of the first tooth row 71A on the front side X2 are directed to the front side X2. Tooth tips 72A of the first teeth 72 of the first tooth row 71B on the rear side X1 are directed to the rear side X1. The first teeth 72 in either row have tooth traces 72B extending along the right-and-left direction Y.

In the second modification, both end portions of a first pressing portion 51 of a moving member 43 in the axial direction X are, as bent portions 51B, bent toward the right side Y1. The bent portions 51B are formed in a pair and face each other in the axial direction X. In the moving member 43, second tooth rows 75 are not formed on opposite side surfaces of a second pressing portion 52 in the axial direction X, but are integrally formed on the respective facing surfaces of the pair of the bent portions 51B. In each second tooth row 75, a plurality of second teeth 82 are arranged at regular intervals along the tilt direction C. Tooth tips 82A of the second teeth 82 of the second tooth row 75A on the front side X2 are directed to the rear side X1. Tooth tips 82A of the second teeth 82 of the second tooth row 75B on the rear side X1 are directed to the front side X2. The second teeth 82 in either row have tooth traces 72B extending along the right-and-left direction Y.

In the second modification, when the operation member 41 is operated to change the steering system 1 into the locked state, the moving member 43 moves toward the right side Y1 from the released position to the locked position. When the steering system 1 has been changed into the locked state, the second pressing portion 52 of the moving member 43 that has reached the locked position reaches the inside of the guide slot 85A of the tooth member 85, and the pair of the bent portions 51B of the first pressing portion 51 of the moving member 43 catch the tooth member 85 from both sides in the axial direction X. In this state, the first teeth 72 of the first tooth row 71A on the front side X2 in the tooth member 85 and the second teeth 82 of the second tooth row 75A on the front side X2 in the moving member 43 mesh with each other alternately arranged in the tilt direction C. The first teeth 72 of the first tooth row 71B on the rear side X1 and the second teeth 82 of the second tooth row 75B on the rear side X1 mesh with each other alternately arranged in the tilt direction C. Thus, the pair of the first tooth rows 71 and the pair of the second tooth rows 75 intermesh with each other.

When the operation member 41 is operated in the opposite direction to change the steering system 1 from the locked state into the released state, in the same manner as in the first modification, the intermeshing between the second tooth rows 75 and the first tooth rows 71 is released. In the second modification also, in the same manner as in the first modification, the steering system 1 can be in the tooth-on-tooth state. In the second modification also, the tooth tip angle α of each first tooth 72 in the first tooth row 71A on the front side X2 is different from the tooth tip angle β of each first tooth 72 in the first tooth row 71B on the rear side X1. The tooth tip angle α is preferably set to be smaller than the tooth tip angle β. It should be noted that, in the second modification, the front-and-rear positional relationship between the first tooth rows 71 and the second tooth rows 75 that mesh with each other is the reverse of that in the embodiment and the first modification. Thus, in a secondary collision, for example, the component force Fx1 (see FIG. 7) is directed to the front side X2, and the component force Fx2 (see FIG. 7) is directed to the rear side X1. When the tooth tip angle α is smaller than the tooth tip angle β, the component force Fx1 is smaller than the component force Fx2, and thus the moving member 43 is biased toward the rear side X1 in the second modification. Even in this case, backlash between the first teeth 72 of the first tooth row 71A and the second teeth 82 of the second tooth row 75A is reduced. Thus, the meshing strength between the first teeth 72 and the second teeth 82 can be increased as described above.

Figure 12:
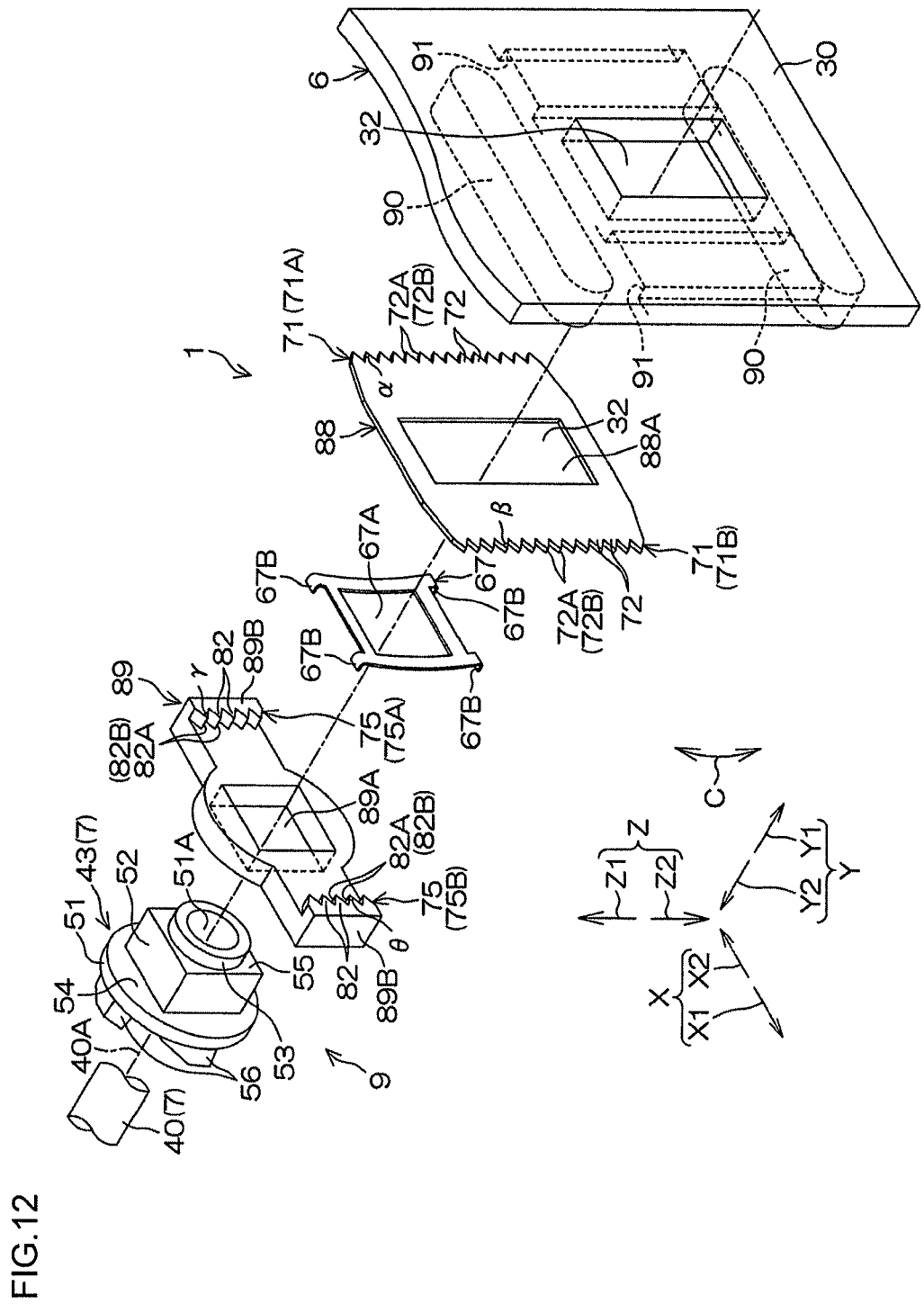
FIG. 12 is an exploded perspective view of a tilt locking mechanism according to a third modification.

FIG. 12 is an exploded perspective view of a tilt locking mechanism 9 according to the third modification. In the third modification, a tilt slot 32 of a side plate 30 of the upper bracket 6 is wide in the axial direction X, and extends straight along the tangential direction to the tilt direction C, that is, the up-and-down direction Z. Thus, during tilt adjustment, the tilt bolt 40 can move on a circular-arc-like trajectory along the tilt direction C within the straight tilt slot 32.

In the third modification, as members separated from the side plate 30, a first tooth member 88 and a second tooth member 89 are provided. The first tooth member 88 is a metal plate that is substantially rectangular when viewed from the right-and-left direction Y and is thin in the right-and-left direction Y. In the substantial center of the first tooth member 88 when viewed from the right-and-left direction Y, a guide slot 88A penetrating the first tooth member 88 in the right-and-left direction Y is formed. The guide slot 88A extends straight along the up-and-down direction Z. The guide slot 88A is narrower than the tilt slot 32 in the axial direction X. Into the guide slot 88A, the tilt bolt 40 is inserted.

In the left side surface of the side plate 30 on the left side Y2, on both outer sides of the tilt slot 32 in the up-and-down direction Z, rib-like guide portions 90 that protrude toward the left side Y2 and extend straight along the axial direction X are integrally formed. The first tooth member 88 is disposed between the upper and lower guide portions 90, and is supported by the side plate 30 via these guide portions 90. The first tooth member 88 can slide in the axial direction X along the guide portions 90, but cannot move in directions other than the axial direction X. In the left side surface of the side plate 30 on the left side Y2, on both outer sides of the tilt slot 32 in the axial direction X, reception grooves 91 that are recessed toward the right side Y1 and extend parallel to the tilt slot 32 are each formed.

A pair of first tooth rows 71 are formed integrally with the first tooth member 88 on its both side edges in the axial direction X. Unlike the embodiment, the first modification, and the second modification, a plurality of first teeth 72 are arranged straight at regular intervals along the up-and-down direction Z in each first tooth row 71 in the third modification. Tooth tips 72A of the first teeth 72 of the first tooth row 71A on the front side X2 are directed to the front side X2. Tooth tips 72A of the first teeth 72 of the first tooth row 71B on the rear side X1 are directed to the rear side X1. The first teeth 72 in either row have tooth traces 72B extending along the right-and-left direction Y.

The second tooth member 89 is formed in a block-like shape that is long in the axial direction X and is thin in the right-and-left direction Y, and is disposed closer to the left side Y2 than the first tooth member 88. In the substantial center of the second tooth member 89 in the axial direction X, a fitting hole 89A penetrating the second tooth member 89 in the right-and-left direction Y is formed. The fitting hole 89A corresponds to a second pressing portion 52 of a moving member 43 when viewed from the right-and-left direction Y, and the second pressing portion 52 is fitted into the fitting hole 89A from the left side Y2. Accordingly, the second tooth member 89 is integrated into the moving member 43.

Both end portions of the second tooth member 89 in the axial direction X are, as bent portions 89B, bent toward the right side Y1. The bent portions 89B are formed in a pair and face each other in the axial direction X. Second tooth rows 75 are integrally formed on the respective facing surfaces of the pair of the bent portions 89B. Tooth tips 82A of the second teeth 82 of the second tooth row 75A on the front side X2 are directed to the rear side X1, and tooth tips 82A of the second teeth 82 of the second tooth row 75B on the rear side X1 are directed to the front side X2. The second teeth 82 in either row have tooth traces 82B extending along the right-and-left direction Y. In each second tooth row 75 in the third modification, the second teeth 82 are arranged straight at regular intervals along the up-and-down direction Z in the same manner as in the first tooth row 71.

The tilt locking mechanism 9 of the third modification may be further different in detail from the tilt locking mechanism 9 of the embodiment. For example, in the tilt locking mechanism 9 of the third modification, the second pressing portion 52 of the moving member 43 has a substantially rectangular profile when viewed from the right side Y1. A boss portion 53 of the moving member 43 is formed in a cylindrical shape. The second pressing portion 52 is fitted into the guide slot 88A of the first tooth member 88. In this state, the moving member 43 can slide along the up-and-down direction Z, but cannot move in the other directions.

An elastic member 67 is a leaf spring that is substantially rectangular when viewed from the right-and-left direction Y, and curves so as to bulge toward the left side Y2. In the center of the elastic member 67 when viewed from the right-and-left direction Y, a fitting hole 67A that is substantially rectangular is formed. On four corners of the substantially rectangular elastic member 67, claw-like engagement portions 67B bending and extending toward the left side Y2 are each integrally formed. The engagement portions 67B engage with the second tooth member 89. Accordingly, the elastic member 67 is positioned on the second tooth member 89, and the second pressing portion 52 is fitted into the fitting hole 67A. Accordingly, the elastic member 67 is positioned on the moving member 43. The elastic member 67 is compressed between the first tooth member 88 and the second tooth member 89. This generates the restoring force. In the third modification, the spacer 68 may be omitted.

In the third modification, when the operation member 41 is operated to change the steering system 1 into the locked state, the moving member 43 moves together with the second tooth member 89 toward the right side Y1 from the released position to the locked position. When the moving member 43 has reached the locked position to change the steering system 1 into the locked state, the pair of the bent portions 89B of the second tooth member 89 catch the first tooth member 88 from both sides in the axial direction X. In this state, the first teeth 72 of the first tooth row 71A on the front side X2 in the first tooth member 88 and the second teeth 82 of the second tooth row 75A on the front side X2 in the second tooth member 89 mesh with each other alternately arranged in the up-and-down direction Z. The first teeth 72 of the first tooth row 71B on the rear side X1 and the second teeth 82 of the second tooth row 75B on the rear side X1 mesh with each other alternately arranged in the up-and-down direction Z. Thus, the pair of the first tooth rows 71 and the pair of the second tooth rows 75 intermesh with each other.

When the operation member 41 is operated in the opposite direction to change the steering system 1 from the locked state into the released state, the moving member 43 moves together with the second tooth member 89 from the locked position toward the left side Y2 and reaches the released position. At this time, by the restoring force of the elastic member 67, movement of the moving member 43 and the second tooth member 89 to the released position is facilitated. When the steering system 1 has been changed into the released state, the second tooth rows 75 have moved to be positioned more toward the left side Y2 than the first tooth row 71. This releases the intermeshing between the second tooth rows 75 and the first tooth rows 71. In this state, when the column jacket 4 is tilted, the second tooth member 89 pivots on the circular-arc-like trajectory along the tilt direction C together with the tilt bolt 40. At this time, the second tooth member 89 moves relatively to the first tooth member 88 in the up-and-down direction Z, and moves integrally therewith in the axial direction X. Thus, the first tooth rows 71 are always disposed at the same positions as those of the corresponding second tooth rows 75 in the axial direction X. Consequently, even if the first tooth rows 71 and the second tooth rows 75 do not extend in a circular-arc-like manner along the tilt direction C but extend straight along the up-and-down direction Z unlike the embodiment, the first modification, and the second modification, the first tooth rows 71 and the second tooth rows 75 can reliably mesh with each other after tilt adjustment.

When the operation member 41 is operated to change the steering system 1 into the locked state with the second tooth rows 75 riding on the first tooth rows 71, the first tooth rows 71 elastically deform toward the side plate 30 on the left side Y2 and are received by the reception grooves 91 of the side plate 30 on the left side Y2. Thus, the steering system 1 is changed into the tooth-on-tooth state. In the third modification also, the tooth tip angle α of each first tooth 72 in the first tooth row 71A on the front side X2 is different from the tooth tip angle β of each first tooth 72 in the first tooth row 71B on the rear side X1. The tooth tip angle α is preferably set to be smaller than the tooth tip angle β. In a secondary collision, for example, in the same manner as the moving member 43 of the second modification, the second tooth member 89 is biased toward the rear side X1. This reduces backlash between the first teeth 72 of the first tooth row 71A and the second teeth 82 of the second tooth row 75A. Consequently, as described above, the meshing strength between the first teeth 72 and the second teeth 82 can be increased.

The present invention can be applied not only to the embodiment and the first modification to the third modification, but also to any tilt locking mechanism 9 in which tooth traces 72B of first teeth 72 and tooth traces 82B of second teeth 82 extend along the right-and-left direction Y parallel to the central axis 40A of a tilt bolt 40. Thus, the present invention can be applied also to the teeth of the holding unit and the tooth plate in the steering column described in US 2009/0013817 A1. A plurality of second teeth 82 are arranged along the tilt direction C, for example, to constitute a pair of second tooth rows 75, but the tooth rows do not have to be constituted. At least one second tooth 82 needs to be formed in each of two locations spaced apart from each other in the axial direction X, which can mesh with a pair of first tooth rows 71.

The tilt locking mechanism 9 may be provided on either one of the right side Y1 and the left side Y2 of the upper bracket 6. The tilt locking mechanism 9 can also be applied to a steering system that does not have the telescopic locking mechanism 8, and to a steering system in which telescopic adjustment cannot be performed. The tilt locking mechanism 9 can also be applied to a steering system 1 in which the connecting plate 31 (see FIG. 2) of the upper bracket 6 and the vehicle body 2 (see FIG. 1) are coupled together by capsules (not depicted). In a secondary collision, resin pins (not depicted) that are inserted through both of the capsules and the connecting plate 31 are broken. This causes the upper bracket 6 to be detached from the vehicle body 2.

The lower jacket 23 only needs to hold the upper jacket 22 as being clamped by a pair of side plates 30 to be reduced in diameter. For example, the end of the slit 33 (see FIG. 2) on the front side X2 may be closed. The steering system 1 may have, instead of the lower jacket 23, a structure of holding the upper jacket 22 without being reduced in diameter. The steering system 1 is not limited to a manual-type steering system that does not assist steering operation of the steering member 11, and may be a column-assist-type electric power steering system that assists steering operation of the steering member 11 with an electric motor.

What is claimed is:

1. A steering system comprising:

a steering shaft, to one end of which a steering member is coupled;

a column jacket that holds the steering shaft and is pivotable about a pivot axis that is on the opposite side of the steering shaft from the one end in an axial direction;

a bracket that is fixed to a vehicle body and supports the column jacket so that the column jacket is pivotable;

an operation member that is operated to allow and prevent pivoting of the column jacket with respect to the bracket;

a pair of tooth rows each including a plurality of first teeth each of which has a tooth trace extending in an orthogonal direction orthogonal to both of the axial direction and an intersecting direction vertically intersecting the axial direction and that are arranged along the intersecting direction, the pair of tooth rows being supported by the bracket and being arranged side by side in the axial direction; and a tooth member including a second tooth that has a tooth trace extending in the orthogonal direction, is formed at least one in each of two locations spaced apart from each other in the axial direction, and is configured to mesh with the pair of tooth rows, the tooth member being pivotable together with the column jacket and being movable in the orthogonal direction in accordance with operation of the operation member, wherein a tooth tip angle of the first teeth in one tooth row of the pair of tooth rows is different from a tooth tip angle of the first teeth in the other tooth row that is more distant from the pivot axis than the one tooth row.

2. The steering system according to claim 1, wherein the tooth tip angle of the first teeth in the one tooth row is smaller than the tooth tip angle of the first teeth in the other tooth row.

* * * * *